US012323299B2

(12) United States Patent
McBride et al.

(10) Patent No.: US 12,323,299 B2
(45) Date of Patent: Jun. 3, 2025

(54) EDGE COMPUTE ENVIRONMENT AUTOMATIC SERVER CONFIGURATION TOOL

(71) Applicant: Level 3 Communications, LLC, Broomfield, CO (US)

(72) Inventors: Kevin McBride, Lone Tree, CO (US); James Sutherland, Vancouver, WA (US); Bryan Dreyer, Bellevue, WA (US); Kristopher Dick, Bellevue, WA (US)

(73) Assignee: Level 3 Communications, LLC, Denver, CO (US)

( * ) Notice: Subject to any disclaimer, the term of this patent is extended or adjusted under 35 U.S.C. 154(b) by 270 days.

(21) Appl. No.: 17/564,637

(22) Filed: Dec. 29, 2021

(65) Prior Publication Data

US 2022/0210016 A1 Jun. 30, 2022

Related U.S. Application Data

(60) Provisional application No. 63/237,011, filed on Aug. 25, 2021, provisional application No. 63/132,953, filed on Dec. 31, 2020.

(51) Int. Cl.
*H04L 41/0866* (2022.01)

(52) U.S. Cl.
CPC ................................ *H04L 41/0866* (2013.01)

(58) Field of Classification Search
CPC ............ H04L 41/0866; H04L 41/0889; H04L 41/0893; H04L 41/22; H04L 41/0806; H04L 43/0817
See application file for complete search history.

(56) References Cited

U.S. PATENT DOCUMENTS

| 9,747,070 | B1 * | 8/2017 | Mutagi | .................. G06F 3/165 |
| 2005/0149610 | A1 * | 7/2005 | Brooks | ............... H04L 41/0806 |
| | | | | 709/200 |

(Continued)

FOREIGN PATENT DOCUMENTS

| WO | WO-2014094821 | | 6/2014 | | |
| WO | WO-2014094821 A1 * | | 6/2014 | ............. | H04L 12/12 |

OTHER PUBLICATIONS

International Search Report and Written Opinion of the International Searching Authority, dated Apr. 26, 2022, Int'l Appl. No. PCT/US21/065489, Int'l Filing Date Dec. 29, 2021; 12 pgs.

(Continued)

*Primary Examiner* — Richard G Keehn

(57) ABSTRACT

A server configuration tool is presented for autonomously configuring servers located in a network. The tool may autonomously configure multiple servers in parallel based on individual states of the servers, which may be periodically and simultaneously determined. For example, the tool may determine which action to take to begin or continue configuring the server based on the present state of each server. Server states (and corresponding actions) can be edited through a user interface to alter the server configuration process without code changes. At any one time, multiple servers may be in different states requiring different configuration operations to configure the servers to be ready for use. The present systems and methods can be used to move multiple servers iteratively through different configuration actions based on the individual state of each server and to perform non-conflicting configuration operations for multiple servers in parallel.

20 Claims, 14 Drawing Sheets

(56) References Cited

U.S. PATENT DOCUMENTS

2019/0132254 A1* 5/2019 Isaacs .................. H04L 47/70
2023/0006878 A1* 1/2023 Sui .................. H04L 41/0627

OTHER PUBLICATIONS

International Preliminary Report on Patentability, dated Jul. 13, 2023, Int'l Appl. No. PCT/US2021/065489, Int'l Filing Date Dec. 29, 2021; 9 pgs.

* cited by examiner

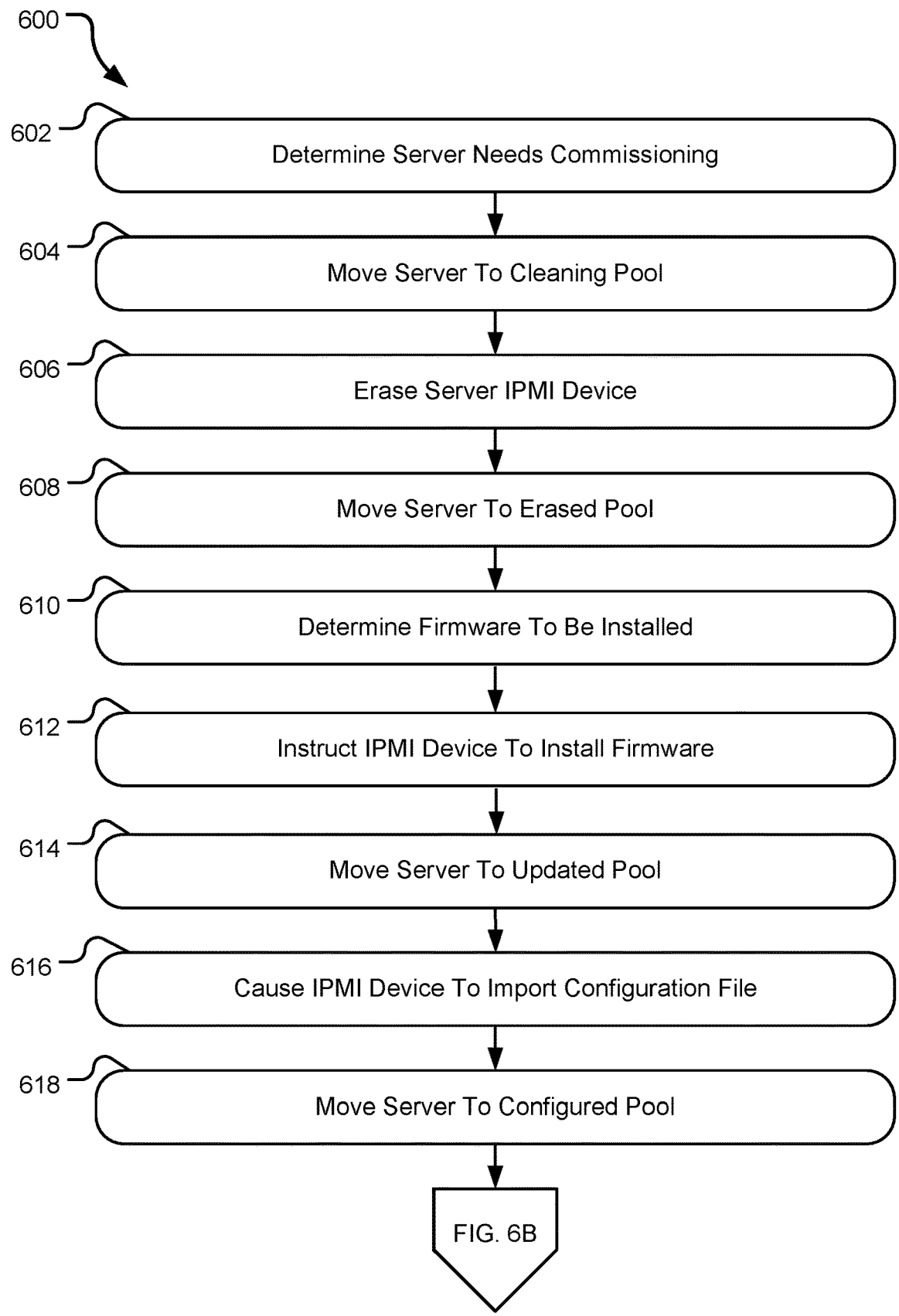

EDGE COMPUTE ENVIRONMENT AUTOMATIC SERVER CONFIGURATION TOOL

CROSS-REFERENCE TO RELATED APPLICATIONS

This application claims the benefit of U.S. Provisional Application No. 63/132,953 filed 31 Dec. 2020, entitled "Edge Compute Environment Automatic Server Configuration Tools," and U.S. Provisional Application No. 63/237,011 filed 25 Aug. 2021, entitled "Edge Compute Environment Automatic Server Configuration Tools," which applications are incorporated herein by reference in their entireties.

BACKGROUND

Communication networks provide for the transmission of information across some distance through terrestrial, wireless or satellite communication networks. Such communications may involve voice, data, multimedia information, etc. In addition, communications networks may be set up as edge computing environments. Edge computing environments distribute components of the communication network to bring computation and data storage closer to locations that need it. Edge computing environments allow a customer of the network to access the network and receive data and information with a lower latency since the network components are geographically closer to the customer.

Many communication network customers lease access to servers or purchase servers that they access over the network rather than installing servers at their home or business. Customers can access these servers through edge compute environments of a network to experience lower latency when accessing the leased or purchased servers. Communication network and server providers need to configure the servers for customer use, so the servers work as the customer expects. Additionally, the providers need to reconfigure and wipe servers that a customer no longer wishes to use to prepare the servers for the next customer and ensure that the previous customer's information saved on the servers is not disclosed to future users of the servers. There may be thousands of servers across the network that need to be configured and/or reconfigured and wiped at any one time. Communication-network and server providers may struggle to efficiently handle the volume of work required to configure that many servers.

It is consideration of these and other issues that various aspects of the present disclosure were developed.

SUMMARY

The present application describes systems and methods for autonomously configuring servers in a network.

One implementation of the present disclosure may take the form of a method of managing servers. The method may include receiving, through a user interface, a definition of multiple server states, receiving, through the user interface, a defined configuration operation for each of the multiple server states, determining, by a server configuration tool, multiple states of a plurality of servers, determining, for each of the plurality of servers, one of the defined configuration operations to be performed based on the determined multiple states of the plurality of servers, including determining that a first server is in a first server state while a second server is in a second server state, and instructing, by the server configuration tool, a server imager to perform, in parallel, a first configuration operation on the first server based on the first server state and a second configuration action on the second server based on the second server state.

Another implementation of the present disclosure may take the form of a non-transitory computer readable medium storing instructions that, when executed by at least one processor, cause the at least one processor to perform a method. In examples, the method may include receiving, through a user interface, a definition of multiple server states, receiving, through the user interface, a defined configuration operation for each of the multiple server states, determining, by a server configuration tool, multiple states of a plurality of servers, determining, for each of the plurality of servers, one of the defined configuration operations to be performed based on the determined multiple states of the plurality of servers, including determining that a first server is in a first server state while a second server is in a second server state, and instructing, by the server configuration tool, a server imager to perform, in parallel, a first configuration operation on the first server based on the first server state and a second configuration action on the second server based on the second server state.

Another implementation of the present disclosure may take the form of a system for managing servers comprising at least one processor and memory, operatively connected to the at least one processor and storing instructions that, when executed by the at least one processor, cause the system to perform a method. In examples, the method may include receiving, through a user interface, a definition of multiple server states, receiving, through the user interface, a defined configuration operation for each of the multiple server states, determining, by a server configuration tool, multiple states of a plurality of servers, determining, for each of the plurality of servers, one of the defined configuration operations to be performed based on the determined multiple states of the plurality of servers, including determining that a first server is in a first server state while a second server is in a second server state, and instructing, by the server configuration tool, a server imager to perform, in parallel, a first configuration operation on the first server based on the first server state and a second configuration action on the second server based on the second server state.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 6A is a flow chart illustrating a method for autonomously moving a server through various configuration stages according to detected server states.

DETAILED DESCRIPTION

Figure 1:
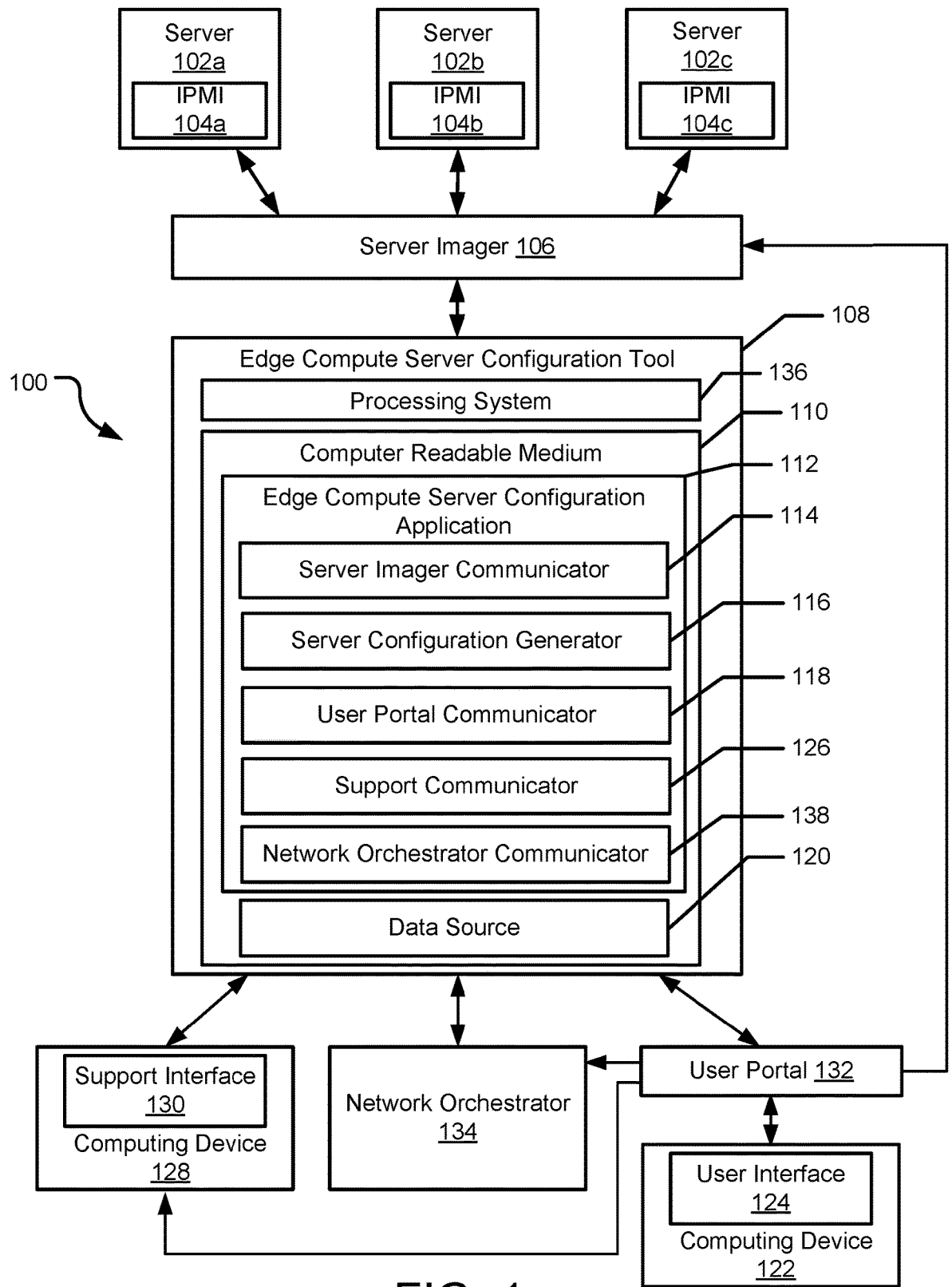
FIG. 1 is a schematic diagram illustrating a system for configuring a server in a network associated with an edge compute environment at an edge of a network in accordance with one example.

Communication networks may provide many services to customers of the network, including transmission of communications between network devices, network services, network computing environments, cloud services (such as storage services, networking service, compute services, etc.), and the like. To provide cloud services such as allowing users to lease and use servers connected to the network, networking components and other devices are interconnected and configured within the network such that customers may access the servers. Generally, an engineer is responsible for remotely or locally accessing the servers and manually configuring settings, ports, operating systems, firmware, among aspects, of the server components to enable the server to be usable by customers. Further, servers may be in many locations to lower the latency when a user wants to access a server. Each location may include thousands of servers, and any number of servers may require configuration or refurbishment at the same time. Such processes can be time consuming, require steps or acts from multiple network groups, and include multiple potential points of delay or potential errors that must be identified and corrected before the server is available to the customer.

Aspects of the present disclosure involve a tool for autonomously configuring servers located in a network. The tool may autonomously configure the servers based on the state of the server. For example, the tool may determine which action to take to begin or continue configuring the server based on the present state of the server. Server states can be added, changed, and/or removed to alter the server configuration process. In some examples, the state of a server can be determined based on a detection of server status and which server pool the server is in. In examples, at any one time, multiple servers may be in different states requiring different configuration operations to configure the servers to be ready for use. The present systems and methods can be used to move multiple servers iteratively through different configuration actions based on the individual state of each server.

In one instance, the server configuration tool may generate a configuration process for configuring servers to be ready for use. The configuration process may be executed by the server configuration tool and/or a server imager. The configuration process may be based on a template and/or desired firmware that may be stored by the server configuration tool or provided to the server configuration tool by the server imager, a user portal, or computing devices via a user interface. The configuration process may include automatically executed configuration instructions or steps that communicate with the servers of the network and configure the servers and the like. Through the configuration, servers may be provided for use by customers of the network. In examples, the autonomous configuration process can be applied to thousands of servers at a time, thereby simplifying server provisioning for system administrators. For example, thousands of servers can be taken from a new-from-the-factory state to a ready-for-customer state and then (after the customer is finished with them) be taken back to a new state without human interaction. Although examples of the process of configuring and reconfiguring a single server are discussed below, the presently automated procedures can be performed in parallel for any number of servers.

The configuration process may include the server imager automatically discovering servers on the one or more networks associated with the edge compute environment. The server configuration tool may determine that one or more server(s) need a particular configuration operation performed by polling the server imager for the state(s) of individual servers. Once the server configuration tool determines that a particular server needs a configuration operation performed, the server configuration tool may execute the configuration operation on the server. The configuration operation can include causing the firmware of the components of the server to be updated, loading a template onto the server, commissioning the server, receiving server data, testing the server, exposing the server to a user interface, and so on.

A customer may select and order the server for use via a customer portal. In some instances, the server must be configured before the server is exposed to the user interface for selection by a user. In other instances, the configuration process for a server will start in response to the user selecting the server for use.

Additionally, a user may release a server the user no longer wants to use. The user may release the server through a user interface that communicates with the user portal. This server may be refurbished by the server configuration tool. Refurbishing the server may include powering the server off and on, causing the server to erase one or more storage drives of the server, and so on.

In one instance, a support interface may be associated with the edge compute configuration tool. The support interface may include one or more portions through which server maintenance may be scheduled. The support interface may be displayed on a computing device and may interact with a user of the computing device, the computing device itself, or a different computing device to receive the maintenance scheduling. The server configuration tool may also display information of the servers via the support interface, including information of the servers, alerts/logs associated with servers that failed configuration, and the like. The alerts may be displayed when a server fails to commission, the server data is not as expected, the server fails a test, and so on. The user may view the alerts and one or more actions may be executed in response to the displayed status information.

Further, the support user interface may be used to define server states for which actions are taken by the edge compute configuration tool. For example, a state may include both a current server status as well as a "pool" to which the server has been assigned. The support user interface can be used to create customized states (e.g., as a combination of new or existing server status(es) and/or server pools. Moreover, the support user interface may be used to define the actions (e.g., configuration operations) to be taken when a server is detected to be in a particular state that is defined in the server configuration tool. Through the server configuration tool, configuration of multiple servers of a network may be executed quickly and reliably for providing use of the server to customers of a network edge site.

In examples, the edge compute server configuration tool acts as a state engine. Flow may proceed to different configuration operations based on the state of the one or more servers being configured. For example, the assigned server pools, the status of the servers, and/or other server information, may indicate the state of the servers. In some examples, only the status or only the pool will define the server state (e.g., all servers with a particular status regardless of pool or all servers in a particular pool regardless of status). In other examples, more than just a server pool or status can be used to define a state definition. For example, any value from a machine description document available to the edge compute server configuration tool can be used in defining, through a support user interface, both a custom/new server state and actions to be taken when a server is detected at run time to be in that state.

In examples, the edge compute server configuration tool acting as a state engine means that the workflow is a product of changes to the machines against which edge compute server configuration tool operates, and not a rigidly defined entity in its own right. In examples, this design has several advantages: (a) the state engine design forces the prerequisites of all actions to be identified and defined; (b) the design ensures actions are not taken against a machine that does not meet the previously mentioned pre-requisites; and (c) multiple non-conflicting actions may be performed in parallel. An additional advantage of the state engine design is that states that do not directly drive actions through the edge compute server configuration tool can, nonetheless, be defined and reported on. In addition, because both the server states and the actions taken with respect to servers determined to be in those states may be configurable through a user interface, changes to how server configurations are performed can be made without code changes.

FIG. 1 is a schematic diagram illustrating a system for configuring a server in a network associated with an edge compute environment at an edge of a network in accordance with one example. In general, the edge compute server configuration system 100 may include an edge compute server configuration tool 108 in communication with servers such as one or more servers 102a-c and the associated intelligent platform management interface (IPMI) devices 104a-c. In some examples, the IPMI devices are integrated Dell Remote Access Controller (iDRAC) devices. The edge compute server configuration tool 108 may also be in communication with a server imager 106, a computing device 128 providing a support interface 130, a computing device 122 providing a user interface 124, a user portal 132, and a network orchestrator 134. The server imager 106 may be, for example, the Metal as a Service system provided by Canonical Ltd. The interactions and communications between the components of the edge compute server configuration system 100 is described in more detail herein.

In examples, the support interface 130 can be provided to allow user input to add, change, and/or remove server states for which the edge compute server configuration tool 108 polls the servers. For example, edge compute server configuration tool 108 may expose the support interface 130 to be rendered on computing device 128 to allow a user to customize the remote server states being utilized by the edge server configuration tool 108 and the actions taken as a result of those detected states. For example, the user can select one or more operations for the edge compute server configuration tool 108 to perform based on a selected server status and server pool, thereby changing the server configuration process. The user can also, through support interface 130, define new server state(s) as defined by one or more customizable server status(es), existing or new server pool(s), or any other value from a server machine description document available to the edge compute server configuration tool. For example, the user may cause the edge compute server configuration tool 108 to (a) define an "erase" state that comprises a detected "ready" status and a determination that the server is in an "erase" pool. The support interface 130 can also be used to define the action taken as a result of the erase state—e.g., causing the storage device of the server in such state to be erased. In an example, the server configuration tool 108 may also be used to remove the defined erase state as an actionable state used by the edge compute server configuration tool 108. The support interface 130 can also be used to define a state that does not have a corresponding configuration action; however, the support interface 130 may include an option to require reporting (e.g., to computing device 122) whenever any servers are detected to be in that state. The server configuration process based on corresponding server states is explained in more detail in relation to FIGS. 6A-6C.

Servers in one or more networks connected to the edge compute environment, such as servers 102a-c, may be geographically located anywhere. Therefore, users of the edge compute environment may use servers that are geographically closer to the user to reduce latency between accessing servers in network.

As explained above, the edge compute server configuration tool 108 may access, configure, and orchestrate the configuration of one or more servers on the networks associated with the edge compute environment. In some instances, the edge compute server configuration tool 108 may include an edge compute server configuration application 112 executed to perform one or more of the operations described herein. The edge compute server configuration application 112 may be stored in a computer readable media 110 (e.g., memory) and executed on a processing system 136 of the edge compute server configuration tool 108 or other type of computing system, such as that described below. For example, the edge compute server configuration application 112 may include instructions that may be executed in an operating system environment, such as a Microsoft Windows™ operating system, a Linux operating system, or a UNIX operating system environment. The computer readable medium 110 includes volatile media, nonvolatile media, removable media, non-removable media, and/or another available medium. By way of example and not limitation, non-transitory computer readable medium 110 comprises computer storage media, such as non-transient storage memory, volatile media, nonvolatile media, removable media, and/or non-removable media implemented in a method or technology for storage of information, such as computer readable instructions, data structures, program modules, or other data.

The edge compute server configuration application 112 may also utilize a data source 120 of the computer readable media 110 for storage of data and information associated with the edge compute server configuration tool 108. For example, the edge compute server configuration application 112 may store information of the servers connected to the edge compute environments, such as servers 102a-c, desired firmware for one or more components of the servers, and expected data of the servers. In general, any data or information utilized by the edge compute server configuration application 112 may be stored and/or retrieved via the data source 120.

The edge compute server configuration application 112 may include several components to perform one or more of the operations described herein. For example, a server imager communicator 114 may be included in the edge compute server configuration application 112 to communicate with the server imager 106. In the example shown in FIG. 1, the edge compute server configuration tool 108 may communicate with the server imager 106 to cause the server imager 106 to communicate with and/or perform one or more desired operations with respect to one or more of the servers 102a-c. The edge compute server configuration tool 108 may communicate with more or fewer such servers 102 via the server imager 106.

The server imager 106 can discover servers located anywhere on the network. For example, the server imager 106 may discover servers via the Preboot eXecution Environment (PXE) boot process. The edge compute server configuration tool 108 may poll the server imager 106 to identify information about the servers. For example, edge compute server configuration tool may poll to determine the servers' states. Depending on how a user has configured the states through the support interface 130, the servers' respective pools and/or statuses (or additional information) may be used to determine the servers' respective states. Depending on the detected states, the sever configuration tool 108 may identify servers needing, for example, configuration operation(s) to be ready for use or refurbishment after use or other servicing/configuration. Once the edge compute server configuration tool 108 determines that one or more servers need configuring or refurbishing, the edge compute server configuration tool 108 may perform operations on the one or more servers, such as updating the firmware of one or more components of the one or more servers to desired firmware, causing templates to be loaded onto one or more servers, creating a server password that is needed to access the server, and so on. These operations will be described in more detail herein with respect to the methods discussed below.

The edge compute server configuration tool 108 may also instruct the server imager 106 to perform operations on the one or more servers needing configuration operation(s). For example, depending on the detected state of the server, the server imager 106 may commission the one or more servers, which includes, for example, collecting information on the server and resetting the IPMI password. The edge compute server configuration tool 108 may receive the server data collected by the server imager 106 to determine whether the server data is as expected. These operations will be described in more detail below with respect to method 300 of FIGS. 3A and 3B. The IPMI devices 104a-c of servers 102a-c allow for monitoring and access of the servers independent of the server's operating system(s). The IPMI devices 104a-c also allow a powered off server to be managed. For example, server 102a may be powered off. The server imager 106 may provide the IPMI password associated with IPMI device 104a to IPMI device 104a and be able to power server 102a on. The IPMI devices 104a-c may also be used to power the respective servers off. In some examples, each server has its own associated IPMI device.

Depending on the detected state(s) of the one or more servers 102, the server imager 106 may also cause one or more servers to be isolated from the edge compute environment and/or network, perform tests on the one or more servers, power the one or more servers on and off, erase one or more storage devices of the one or more servers, and so on. These operations will be described in more detail below with respect to method 300 of FIGS. 3A and 3B and method 500 of FIGS. 5, 5A and 5B.

The edge compute server configuration application 112 may also include a user portal communicator 118 to communicate with a user portal 132. For example, the user portal communicator 118 may communicate with the user portal 132 so the user portal 132 knows which servers in the networks associated with the edge compute environment are available for use. The user portal communicator 118 may provide the user portal 132 with information associated with the server such as the geographic location and size of the server.

The user portal 132 may be in communication with a computing device 122 executing a user interface program 124. The computing device 122 may provide the user interface (e.g., a command line interface (CLI), a graphical user interface (GUI), etc.) 124 displayed on a display, such as a computer monitor, for displaying data. The user portal 132 may provide the computing device 122 with all the information to be displayed on the user interface 124. For example, the user portal 132 may provide a list of one or more servers available for use and associated information such as the geographic location and size of the server. The user portal 132 may also provide inputs for a user to select desired properties of a server being selected for use. When a user selects a server for use, the user portal 132 may assign a server to the user and cause the server to be configured for the user, such according to method 400 shown in FIG. 4 and described in more detail herein.

Additionally, the user portal may provide selectable inputs for the user to release a server through the user interface 124. Through the user interface 124, a user may provide inputs for leasing or releasing one or more servers of the networks associated with the edge compute environment through one or more input devices. For example, a user may select to lease an available server, such as server 102a or release a server such as server 102b that the user is currently using and no longer wishes to use. The input device for providing the inputs to the user interface 124 may include, among others, a keyboard or a pointing device (e.g., a mouse, trackball, pen, or touch screen) to enter data into or interact with the user interface. The user portal 132 may be connected to multiple computing devices providing user interfaces.

In an example, when a user provides an indication to release a server, the user portal 132 may instruct the server imager 106 to mark the released server as being in a pool and/or having a status indicating that the server needs refurbishment. The marked server would then be able to be determined as needing to be refurbished by the edge compute server configuration tool 108 as described in method 500 of FIGS. 5, 5A, and 5B. In some examples, the user portal 132 also instructs the network orchestrator 134 to reconfigure the released server's switch ports.

The edge compute server configuration tool 108 may also include a server configuration generator 116 for constructing or generating a server configuration plan. In general, the server configuration generator 116 determines configuration operations needed for particular server(s) by polling the server imager 106 or the user portal 132 and receives server data from the server imager 106 and/or the data source 120. The server configuration generator 116 generates a list of operations or configuration steps for configuring the servers, depending on their detected state(s). One or more of the operations of the server configuration generator 116 are described in more detail below with reference to the methods discussed below. The edge compute server configuration application 112 may, in some instances, execute one or more of the configuration plans generated by the server configuration generator 116 to configure one or more servers in the networks associated with the edge compute environment. In one example, execution of the configuration plan may include the server imager communicator 114 instructing the server imager 106 to execute at least part of the configuration plan.

The edge compute server configuration application 112 may also include a support communicator 126 to communicate with a computing device 128. For example, when a server fails to commission properly, the server data is not as expected, and/or when the server tests fail, the support communicator 126 may send an alert to computing device 128. The alert may detail the issue the server is experiencing. The support communicator 126 may be in communication with a computing device 128 executing the support interface 130. The computing device 128 may provide the support interface (e.g., a command line interface (CLI), a graphical user interface (GUI), etc.) 130 displayed on a display, such as a computer monitor, for displaying data. Through the support interface 130, a user may view the alerts delivered by the support communicator 126 and provide inputs to address the one or more issues the server the alert was issued for is experiencing. For example, if the cabling of the server is not as expected, the support interface may display the alert identifying the server's cabling as the issue. The user may then schedule maintenance or other operations by providing inputs through the support interface 130. The input device for providing the inputs to the support interface 130 may include any of the inputs described above.

The edge compute server configuration application 112 may also include a network orchestrator communicator 138 to communicate with a network orchestrator 134. The network orchestrator 134 may reconfigure one or more servers' switch ports to move the server to the build network on which the server will be commissioned, refurbished, and otherwise built for use, and/or move the server to a user's Virtual Local Area Network (VLAN) on which the server operates or will operate.

It should be appreciated that the components described herein are provided only as examples, and that the edge compute server configuration application 112 may have different components, additional components, or fewer components than those described herein. For example, one or more components as described in FIG. 1 may be combined into a single component. As another example, certain components described herein may be encoded on, and executed on other computing systems, such as on one remotely coupled to edge compute server configuration tool 108.

Figure 1A:
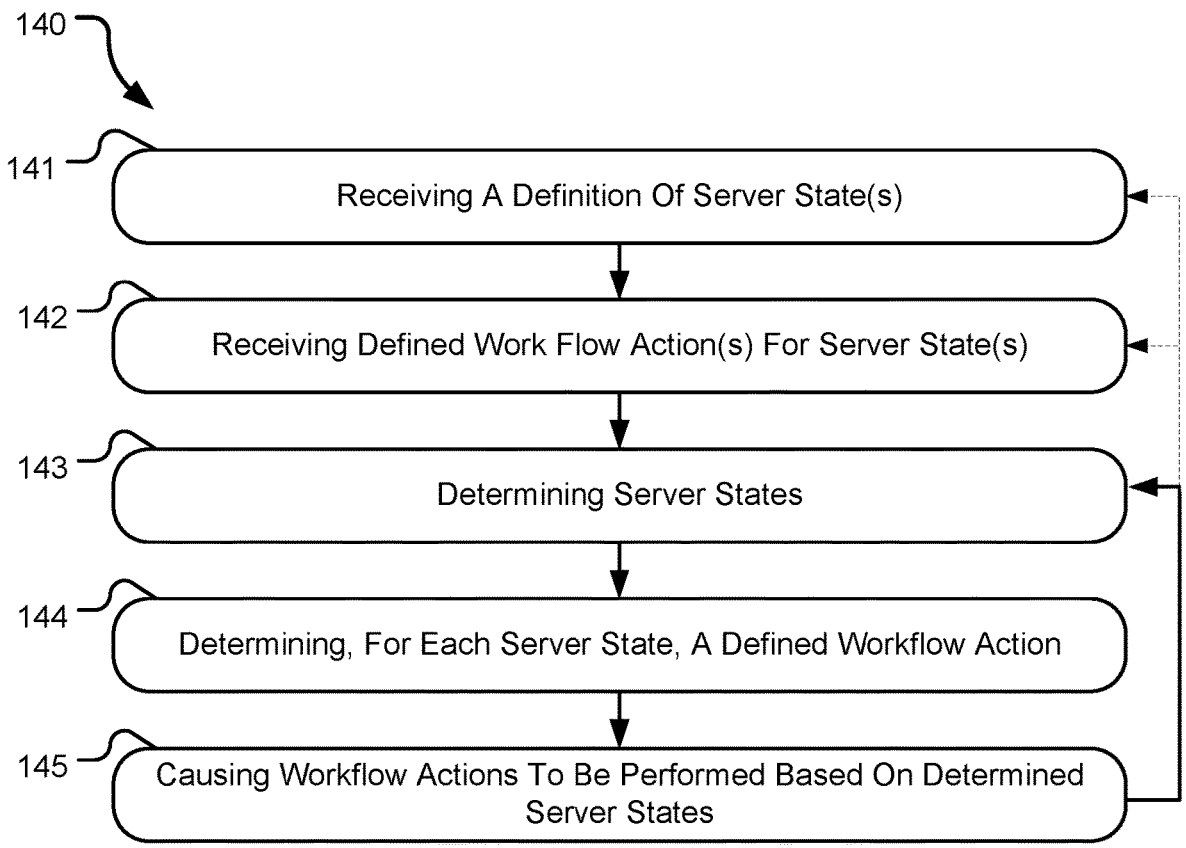
FIG. 1A is a flowchart illustrating a method of defining server states and associated configuration operations and using defined server states and configuration operations to configure servers.

FIG. 1A is a flowchart illustrating a method 140 for autonomously configuring multiple servers based on user-defined server states and associated configuration operations. In examples, some or all of the method 140 may be performed by edge compute server configuration tool 108. Beginning at operation 141, definitions of multiple server states may be received. For example, a user may define new or custom server states through the support interface 130 such that edge compute server configuration tool 108 can operate as a state machine to perform certain workflow actions (e.g., configuration operations) based on the detected states of servers within system 100. As discussed, in examples, support interface 130 allows user input to add, change, and/or remove server states for which the edge compute server configuration tool 108 polls the servers. For example, edge compute server configuration tool 108 may expose the support interface 130 to be rendered on computing device 128 to allow a user to customize the remote server states being utilized by the edge server configuration tool 108. The user can also, through support interface 130, define new server state(s) as defined by one or more customizable server status(es), existing or new server pool(s), or any other value from, e.g., a server machine description document available to the edge compute server configuration tool. As one nonexclusive example, the user may cause the edge compute server configuration tool 108 to (a) define an "erase" state that comprises a detected "ready" status and a determination that the server is in an "erase" pool. In examples, server pools may be determined and/or maintained on server imager 106. In an example, the server configuration tool 108 may also be used to remove a defined server state, such as the defined erase state, as an actionable state used by the edge compute server configuration tool 108.

At operation 142, defined work flow action(s) (e.g., configuration operation(s)) for each of the server states are received. For example, the user can select or define one or more configuration operations for the edge compute server configuration tool 108 to perform based on a detected server state (e.g., a selected server status and server pool, among other information), thereby changing the server configuration process based on the server state definitions and corresponding work flow action(s) without code changes. As a nonexclusive example, the support interface 130 can be used to define the action taken as a result of the erase state—e.g., causing the storage device of the server in such state to be erased.

At operation 143, the server states are determined. For example, edge compute server configuration tool 108 may poll (or cause server imager 106 to poll) all of the servers (e.g., servers 102a, 102b, and 102c) in system 100 to determine the state of each server. In examples, the servers are polled periodically or on demand. In other examples, the servers are programmed to push state information to the edge compute server configuration tool 108 (e.g., through server imager 106). Server states may be determined by obtaining, by the edge compute server configuration tool 108, a server machine description document from each server and/or from server imager 106. The server machine description document may include the information needed for edge compute server configuration tool 108 to determine the state based on the defined state definitions. In examples where the server state is based on the server's status and/or the pool into which the server has been placed, such information may be returned by each server (e.g., in a server machine description document) to the edge compute server configuration tool 108, so that the state of each server can be determined.

At operation 144, the defined workflow action (e.g., configuration operation) for each of the detected server states, is determined, and at operation 145, such actions are caused to be performed. For example, edge compute server configuration tool 108 may determine that server 102a is in an erase state and that the defined workflow action for that server state is to cause the storage device on that server to be erased. Edge compute server configuration tool 108 may also determine that server 102b has a "new" status and is in a "default" pool, so its state is "needs commissioning." As such, the edge compute server configuration tool may cause server 102a to have its storage device erased, while causing server 102b to start the commissioning process. In examples, after the defined workflow action is performed, the server may be moved to a different pool and/or status. For example, edge compute server configuration tool 108 may cause server imager 106 to change the pool to which that server has been assigned.

In examples, flow may proceed from operation 145 back to operation 143 on a periodic basis to repeatedly check server states and perform corresponding workflow actions within the system. In examples, if a new definition of one or more server states and/or defined workflow actions is received, flow may also proceed back to operation 141 or 142. In examples, method 140 may be performed simultaneously on a large number of servers in the system 100, allowing each server in the system to be autonomously managed based on its state at the time the server state(s) are determined (e.g., at operation 143). In this manner, servers may be autonomously propagated through the server configuration process at different stages depending on the individual server state(s) at that time the server state(s) are determined.

FIGS. 1B through 5B describe systems and processes for autonomously commissioning and refurbishing servers and making servers available for use, according to examples. An example of the use of server states in propagating servers through the server configuration is also explained in more detail in relation to FIGS. 6A-6C.

Figure 1B:
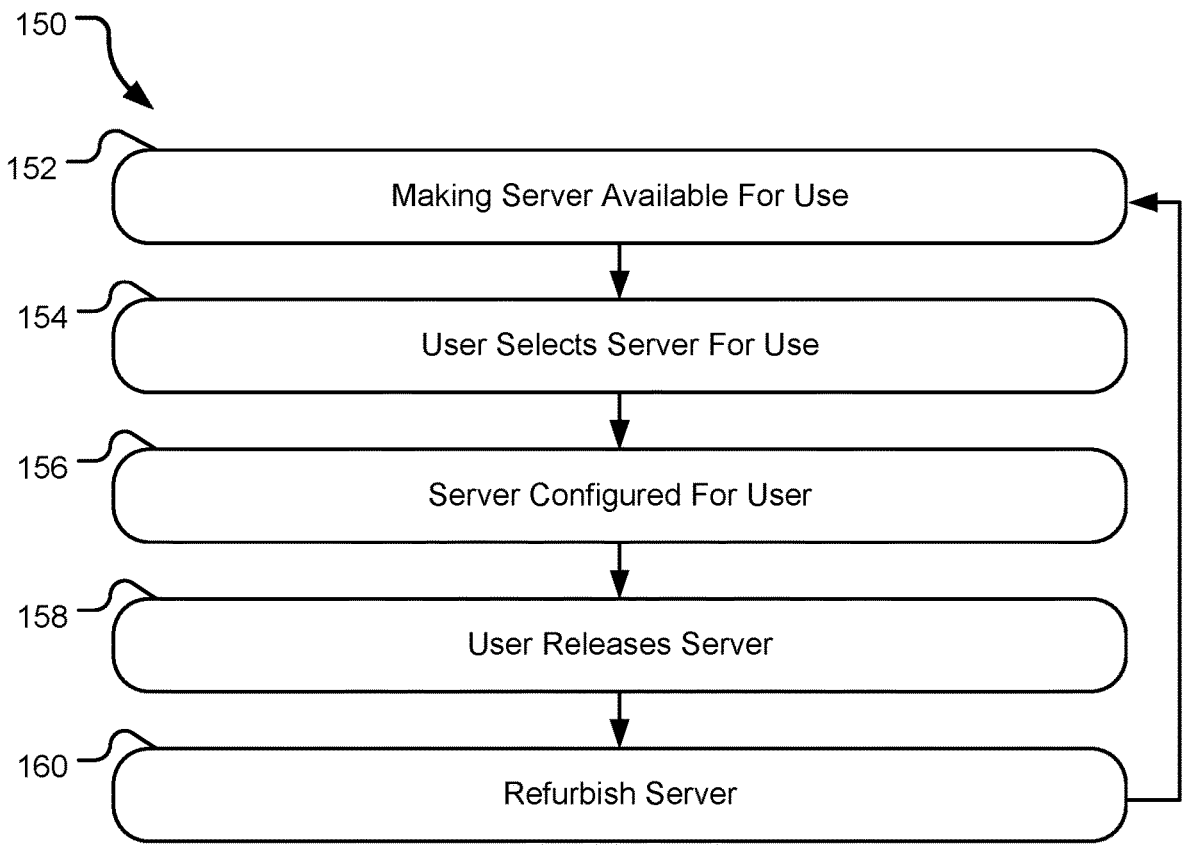
FIG. 1B is a flowchart illustrating a method for autonomously configuring a server for use, assigning the server to a user, and refurbishing the server when the user releases the server.

FIG. 1B is a flowchart illustrating a method 150 for autonomously making a server available for use, configuring the server for a user, and refurbishing the server when the user releases the server. Beginning in operation 152, the server is configured to be available for customer use. For example, the server may be configured and exposed in a pool of servers available for customer use according to method 300 shown in FIGS. 3A and 3B and described in detail below. The server may be a new server or a refurbished server.

Flow proceeds to operation 154, and a user selects a server from the pool of available servers for use. For example, the user may select properties of the server the user wishes to use through user interface 124 of the computing device 122. When the user selects a server for use, flow proceeds to operation 156. In operation 156, a server is configured for use. For example, the server may be assigned to a user and configured for use by that user according to method 400 shown in FIG. 4 and described in detail below. As explained, the server may be configured by propagating the server through various states to cause the automatic execution of particular configuration operations.

At some time after the server is assigned to a user and configured, and the user no longer needs the server, flow proceeds to operation 158, and the user releases the server. For example, the user may request to release a server the user no longer needs via the user interface 124 of the computing device 122. When the user releases the server, flow proceeds to operation 160. In operation 160, the server is refurbished. For example, the server may be refurbished according to method 500 shown in FIGS. 5, 5A, and 5B and described in detail below.

Once the server is refurbished, flow proceeds back to operation 152, and the refurbished server is configured again to be ready for use by another user. In examples, method 150 may be automatically completed by one or more components of the edge compute server configuration system 100 shown in FIG. 1. Therefore, any number of new servers and refurbished servers may be automatically prepared for use, and any number of servers released by users may be automatically refurbished and subsequently configured to be ready for use by another user.

Figure 2:
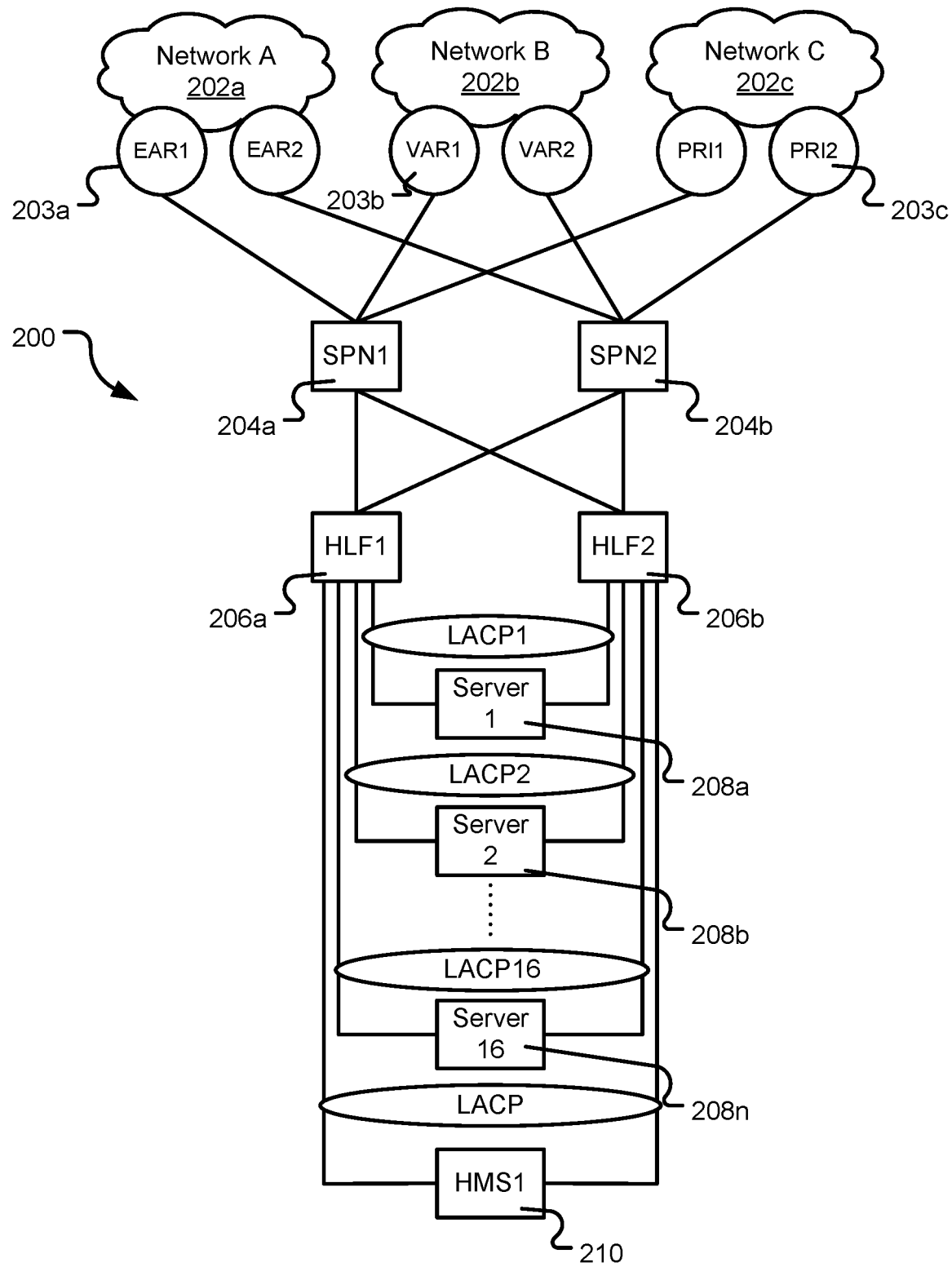
FIG. 2 is a schematic diagram illustrating an edge compute environment of a network in accordance with one example.

FIG. 2 is a schematic diagram illustrating an edge compute environment 200 of an edge site of a network in accordance with one embodiment. In general, the edge compute environment 200 of FIG. 2 illustrates one example of components of an edge site of a network or collection of networks 202a-202c from which compute services may be provided to customers connected or otherwise in communication with the edge site. By providing the environment 200 in an edge site of the network(s) 202, servers may be provided to customers with a lower latency than if the compute environment is included deeper within the network or further away from the requesting customer of the network. It should be appreciated, however, that an edge compute system may include more or fewer components than those illustrated in FIG. 2 and may be connected in other configurations than shown. Rather, the system 200 of FIG. 2 is but one example of an edge compute system 200 for providing compute services to devices or networks connected to or otherwise in communication with the edge compute system.

In the instance shown, the components of the system 200 may be installed or associated with a network site at the edge of one or more networks 202a-c. In general, an edge site of a network is a network site in which customer equipment may connect to the network(s) 202 for access to services and transmission routes of the network. Further and as discussed above, the network(s) 202 may include more than one public and/or private network interconnected to form a general network 202. Each network instance may include one or more edge devices 203 that provide gateways or ingress/egress devices for the associated network. In FIG. 2, network 202a may include edge devices 203a, network 202b may include edge devices 203b, and network 202c may include edge devices 203c. Each edge device 203 of the networks 202 may connect or otherwise communicate with one or more spine switch devices 204a-b. One or more host leaf switches 206a-b may interconnect with the one or more spine switch devices 204a-b of the environment 200 to form a switch mesh for connecting to the network 202 via edge devices 203. In some instances, more or fewer spine switch devices 204 and/or host leaf switches 206 may be included in the edge compute environment 200. Further, each spine switch 204 and host leaf switch 206 may provide redundancy failover services for a corresponding switch.

One or more application servers 208a-n or other types of servers may be connected to each host leaf switch 206. In one implementation, the servers 208 may host and execute applications to provide particular services to customers of the network 202. In other implementations, the servers 208 may be leased by customers for their use. For example, the servers 208 may be configured to provide compute services (as well as other cloud computing services) to customers in communication with the servers 208. Further, although 16 such servers are illustrated in FIG. 2, the environment 200 may include more or fewer servers 208 for leasing and/or providing services to customers. The environment 200 may also include a host management switch 210 connected to the host leaf switches 206 for managing aspects of the switching mesh and communications to/from the servers 208. Through the environment 200 of FIG. 2, an edge compute service and/or access to servers may be provided to customers of the network 202 requesting such services and/or access to servers from the network 202 while reducing the latency of providing the services to the customers. In examples, any of the servers or other devices depicted in FIG. 2 may be examples of severs 102a, 102b, and/or 102c that can be configured and/or refurbished according to the systems and methods discussed in this application.

Figure 3A:
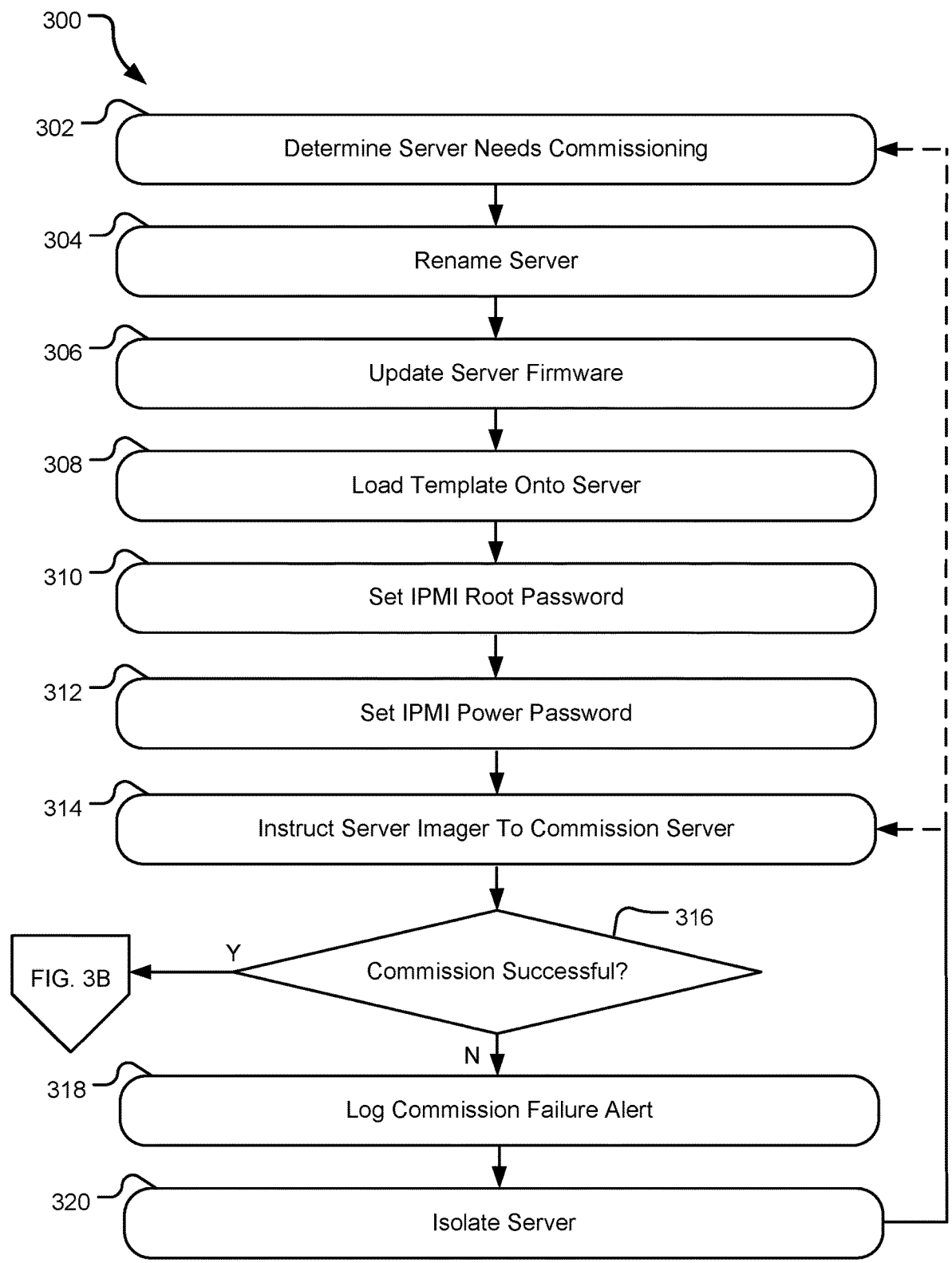
FIG. 3A is a flowchart illustrating a method for configuring a server to be ready for use.

FIG. 3A is a flowchart illustrating a method 300 for configuring a server to be ready for use. In one implementation, one or more of the operations of the method 300 may be performed by the edge compute server configuration application 112. In other implementations, one or more of the operations may be performed by other components of the edge compute server configuration tool 108 or still other systems. The operations may be executed by hardware components of the relevant systems, software programs of the systems, or a combination of hardware and software components of the system. Flow may proceed to different operations of the method 300 based on the state (e.g., pool and status) of the one or more servers being configured. In examples, the state of multiple servers may be simultaneously determined. As such, elements of method 300 may be performed on different servers in parallel.

Beginning in operation 302, it is determined that a server needs to be commissioned. For example, the edge compute server configuration tool 108 determines that a server needs commissioning based on a detected state (e.g., pool and status) of the server. In one example, the server is a new server. The new server may have a "new" status and be in a "default" pool. A server state may comprise a condition of the server (e.g., "new" or "refurbished") and a server pool may be a defined grouping of one or more servers. In examples, a user through the support interface may be defined a state of "needs commissioning" based on the status and pool of each server (e.g., "new" status and "default" pool). In general, the server may be located in any network associated with edge compute environment and anywhere geographically. For example, the server may be any of the servers 102a-c as shown in FIG. 1 or a server in a network associated with the edge compute environment that is not shown. In some examples, the edge compute server configuration tool 108 determines that the server needs commissioning by communicating with the server imager 106. The edge compute server configuration tool 108 may continuously poll the server imager 106 to determine whether a server needs commissioning by determining information about the server (e.g., status, pool, or other user-configurable information). For example, the edge compute server configuration tool 108 may poll the server imager 106 every thirty minutes to find a server needing commissioning. In examples, the edge compute server configuration tool 108 polls the server imager 106 to identify servers with a "new" status, indicating a new server that needs commissioning. In examples, the server is already in the build network. In other examples, the server may be in a different network such as a previous user's network (such as a VLAN), and the user portal 132 may instruct the network orchestrator 134 to move the server to the build network. When the edge compute server configuration tool 108 polls the server imager 106, the edge compute server configuration tool 108 may receive information about multiple servers and/or every server in the networks associated with the edge compute environment. In examples, the edge compute server configuration tool 108 can determine that multiple servers need commissioning and begin the commissioning process for every server simultaneously. In addition, multiple servers that are detected to be in different states can simultaneously be acted upon based on user-defined actions for servers in those states.

In this example, once it is determined that a server needs commissioning, flow proceeds to operation 304. In operation 304, the server is renamed. For example, the edge compute server configuration tool 108 may instruct the server imager 106, via the server imager communicator 114, to rename the server. The server imager 106 may rename the server according to a desired naming protocol so the server may be identified. For example, the name may be based on characteristics of the server and/or connections of the server (as explained in more detail in relation to FIGS. 6A-6C).

Once the server is renamed, flow proceeds to operation 306. Flow may proceed with respect to a particular server based on that server moving to a different state. For example, once a server has been renamed at operation 304, the state of that server may be changed such that, when that server's state is again determined, the next configuration operation defined for the new state of that server is operation 306. In operation 306, the firmware for one or more components of the server needing commissioning may be updated. In some examples, the edge compute server configuration tool 108 determines the desired firmware for one or more components of the server. In other examples, the edge compute server configuration tool 108 may also utilize a data source 120 of the computer readable media 110 for storage of data and information. For example, the edge compute server configuration application 112 may store the desired firmware for one or more components of a server in a network associated with the edge compute environment. The edge compute server configuration tool 108 compares the desired firmware for the one or more components of the server to the firmware installed on the components to determine which components to update. The edge compute server configuration tool 108 will then cause the determined components of the server to update to the desired firmware. For example, the server configuration generator 116 may determine the existing firmware for any components of the server needing commissioning and generate and/or retrieve the desired firmware for the components of the server needing commissioning. If a component of the server needing configuration does not have the desired firmware version, the server configuration generator 116 can cause the desired firmware of the server component to be uploaded or updated. In some examples, the server configuration generator 116 communicates with the server imager 106 to upload or alter the firmware of the server components. The server configuration generator 116 may indicate which components of the server need to be altered to the server imager 106. The server imager 106 may then alter the firmware of the server components.

When the components of the server have the desired firmware, flow proceeds to operation 308 (e.g., based on a changed state of the particular server after operation 306, as discussed). In operation 308, a template is loaded onto the server needing commissioning. For example, the edge compute server configuration tool 108 may cause a template to be loaded on one or more of the servers 102a-c. In some examples, the template is a golden image. The golden image may be loaded onto the IPMI device on the server. For example, where Dell brand servers are used, the edge compute server configuration tool 108 loads an iDRAC golden image onto the iDRAC device on the server. In further examples, operation 306 and 308 may be combined into a single operation, and the template includes the desired firmware for the one or more components of the server. The loaded template may replace the firmware of the server with the desired firmware.

Once the template is loaded onto the server, flow proceeds to operation 310 (e.g., based on a changed state of the particular server after operation 308, as discussed). In operation 310, an IPMI root password is set. For example, the edge compute server configuration tool 108 may set an IPMI root password that is needed to communicate with and access the server needing configuration. Specifically, the server configuration generator 116 may set the password to a standard password that is used to access the IPMI device of the server. In one example, the server imager 106 has the standard IPMI root password to communicate with the server. In another example, the server configuration generator 116 may provide the root password to the server imager 106 via the server imager communicator 114 so the server imager 106 may communicate with and configure the server.

Once the server password is created, flow proceeds to operation 312 (e.g., based on a changed state of the particular server after operation 310, as discussed). In operation 312, an IPMI power password is set. For example, the edge compute server configuration tool 108 may set an IPMI power password that is needed to power the server on and off. In an example, the edge compute server configuration tool 108 instructs the server imager 106 to send an IPMI power password that the server imager 106 stores. The edge compute server configuration tool 108 may set the IPMI power password to the IPMI power password received from the server imager 106, allowing the server imager 106 to power the server on and off.

Once the IPMI power password is set, flow proceeds to operation 314 (e.g., based on a changed state of the particular server after operation 312, as discussed), and a server imager is instructed to commission the server. For example, the edge compute server configuration tool 108 instructs the server imager 106, via the server imager communicator 114, to commission the server. Commissioning the server may include configuring the server, collecting information about the server, and other operations. In an example, commissioning the server includes powering on the server. For example, the server imager 106 may use the IPMI power password to power on the server. The server may be powered on during commissioning because a new server is installed in powered off state. In some examples, commissioning the server includes collecting information of the size of the server, the server's geographic location, and information on the physical ports and cabling of the server. The server size may be based on the amount of storage, which may include volatile memory (e.g., dynamic random access memory (DRAM), static random access memory (SRAM), etc.) and/or non-volatile memory (e.g., read-only memory (ROM), flash memory, etc.). The size may also be based on the amount of storage disks, which may be physical disks or virtual disks. In some examples, the server size is based on the properties of the central processing unit of the server. The server imager 106 may assign the server a size tag based on the size of the server. In an example, the server imager 106 determines the server's location using the link layer discovery protocol (LLDP) data associated with the server. The server imager 106 may assign the server a location tag based on the server location data, such as the LLDP data. In some examples, the location tag is a Common Language Location Identifier (CLLI) tag. In some examples, the LLDP data is used to acquire the information regarding the physical ports and cabling.

When the server is commissioned, flow proceeds to operation 316, and it is determined, e.g., by the edge compute server configuration tool 108, whether the server is commissioned. In some examples, the edge compute server configuration tool 108 receives the confirmation by polling the server imager 106. The server imager 106 may assign the commissioned server a "ready" status after commissioning concludes or a "commission failed" status if commissioning is unsuccessful. The server imager communicator 114 may poll the server imager 106 to identify one or more servers that have the "ready" or the "commission failed" status. For example, the server imager communicator 114 may poll the server imager 106 every five minutes to check for servers having a "ready" or "commission failed" status.

If the commission is unsuccessful and the server has the "commission failed" status, flow proceeds to operation 318. For example, the server imager 106 may give a server that the server imager 106 could not commission the "commission failed" status. The server may fail commissioning for several reasons. For example, a disk may have failed in the server, there may be malicious software installed on the server, and/or other physical or software related failures. The edge compute server configuration tool 108 may identify the servers with a "commission failed" status when the edge compute server configuration tool 108 polls the server imager 106 via the server imager communicator 114.

In operation 318, a commission failure alert is logged. For example, when the edge compute server configuration tool 108 discovers servers with a "commission failed" status, the edge compute server configuration tool 108 may log the alert by sending the commission failure alert to the user portal 132. When the user portal receives the commission failure alert, the user portal 132 may open a support ticket by communicating with computing device 128. In another example, when the edge compute server configuration tool 108 discovers servers with a "commission failed" status, the edge compute server configuration tool 108 may communicate directly with computing device 128, via the support communicator 126, to log the issue and/or alert a user of the computing device 128, such as by opening a support ticket. The user may view the alert and/or support ticket when the computing device 128 displays the alert and/or support ticket in the support interface 130. The alert may include information about the server that failed commissioning, including the name of the server, the size of the server, the geographic location of the server, and/or why the server failed to commission. The alert may allow the user to schedule and/or perform the maintenance necessary to continue configuring the server for use, such as in-person maintenance of the server.

Once commission failure alert is logged, flow proceeds to operation 320, and the server is isolated. For example, the edge compute server configuration tool 108 instructs the server imager 106 to cause the server to be isolated from the edge compute environment and/or network. The server imager 106 may cause the server to be isolated to prevent the server from spreading malicious software that may be stored on the server and/or prevent the server from otherwise interfering with the operation of the edge compute environment, the networks, and the other servers in the servers associated with the edge compute environment. In some examples, the server imager 106 may isolate the server by causing any data ports the server has to be turned off.

Once the maintenance the server requires is completed, the server may be commissioned again. For example, the server imager 106 may reattempt to commission the server. Flow proceeds back to 302 or 314 depending on the reason (s) the commissioning failed. In some examples, some steps of method 300 that were previously completed may be omitted based on the reason(s) the server required maintenance when flow proceeds back to operation 302. Again, this may be based on the server's state, when determined.

Referring back to operation 316, the edge compute server configuration tool 108 has confirmation that the server is commissioned when the server has the "ready" status. If the edge compute server configuration tool 108 determines that the server has the "ready" status, flow proceeds to FIG. 3B.

Figure 3B:
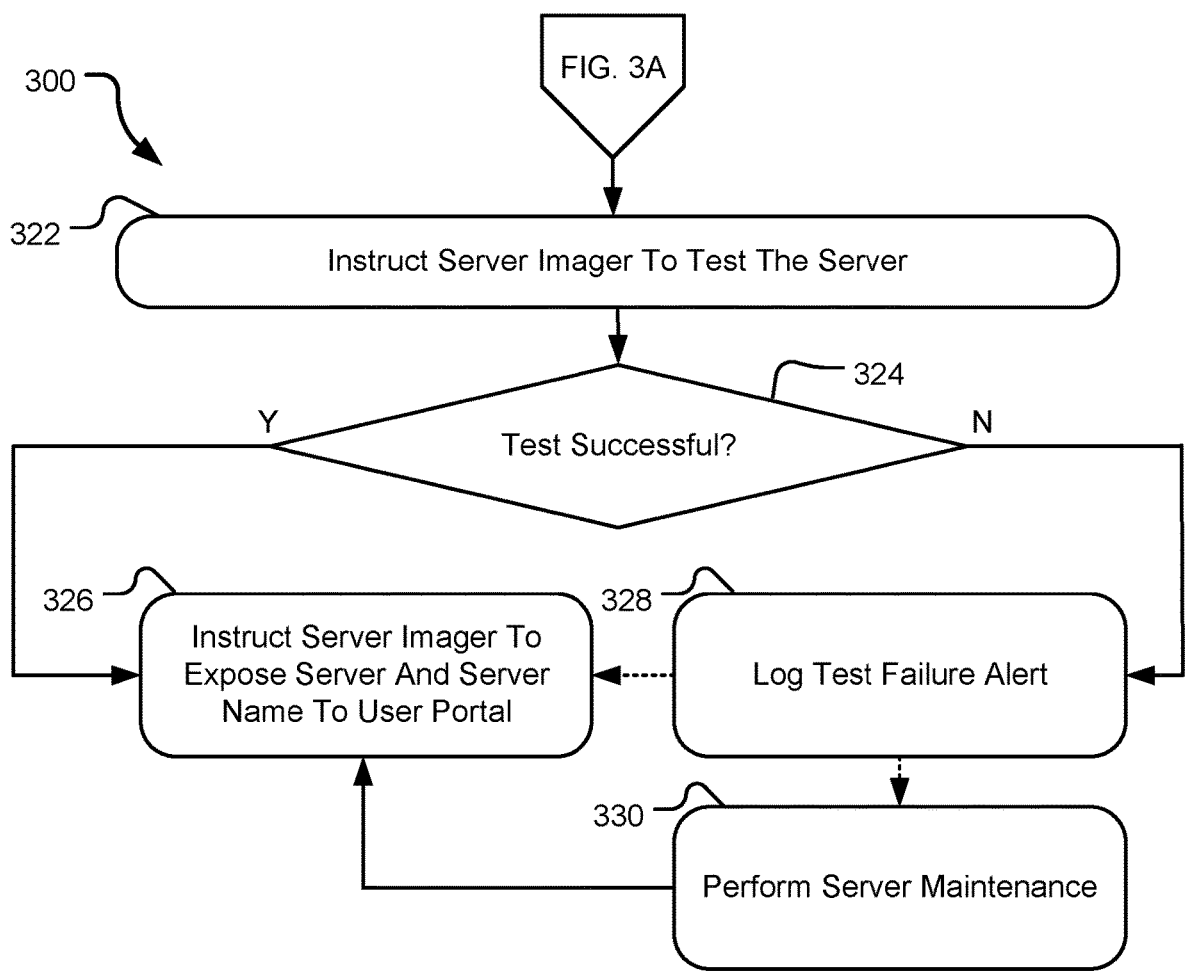
FIG. 3B is a flowchart illustrating a method for configuring a server to be ready for use.

FIG. 3B is a flowchart illustrating a continuing method 300 for configuring a server to be ready for use. Once the server is determined to be commissioned successfully, flow then proceeds to operation 322 (e.g., based on a changed state of the particular server, as discussed). In operation 322, a server imager is instructed to test the server. For example, the edge compute server configuration tool 108 instructs the server imager 106 to test the commissioned server. The server imager 106 may run one or more tests on the server. In some examples, the server imager 106 may test the memory of the server, including nonvolatile memory and/or volatile memory, test the disks of the server, test the physical ports and cabling of the server, cause the server to perform burn-in tests, and/or other hardware tests.

In another example, the edge compute server configuration tool 108 tests the server by comparing the hardware configuration reported by the server imager 106 with one or more configurable templates, such as templates created by server configuration generator 116 and/or stored in data store 120. The edge compute server configuration tool 108 compares the reported hardware configuration with the one or more configuration templates to ensure that the server has the characteristics the edge compute server configuration tool 108 expects.

In an additional example, the edge compute server configuration tool 108 tests the server by validating the connection between the server and any devices to which the server is connected. The edge compute server configuration tool 108 validates the connections by comparing the connections to one or more configurable connection maps. The connection maps contain information on how the server is expected to be connected.

A burn-in test examines the server memory and central processing unit over heavy, sustained use. In an example, the burn-in test is only performed if there are enough available servers for users to select for use. For example, the edge compute server configuration tool 108, via the server imager communicator 114, may poll the server imager 106 to determine the available server inventory for user selection. If the server inventory is at a sufficient value, which may be a predetermined value or determined by the edge compute server configuration tool 108, the server may be caused to perform a burn-in test.

Once the tests are complete, flow proceeds to operation 324, where it is determined whether the one or more tests are successful. For example, the edge compute server configuration tool 108, via the server imager communicator 114, may poll the server imager 106 to determine if the one or more tests are successful.

If the one or more tests are successful, flow proceeds to operation 326 (e.g., based on a changed state of the particular server, as discussed). In operation 326, a server imager is instructed to expose the configured server to a user portal. For example, the edge compute server configuration tool 108 may instruct the server imager 106 to expose the server and server name to the user portal 132. This may allow a user of the user interface 124 to select the configured server for use. In some examples, the user portal communicator 118 may expose the server by communicating with the user portal 132. In other examples, the edge compute server configuration tool 108 may instruct the server imager 106 to move the server to a pool of available servers. For example, a new server may be moved from a new server pool to the pool of available servers. The user portal 132 may select a server from the pool of available servers when a user selects a server for use, such as in method 400 shown in FIG. 4 described in more detail herein.

If the one or more tests are not successful, flow proceeds to operation 328. In operation 328, a test failure alert is logged. For example, the edge compute server configuration tool 108 may log the alert by sending the test failure alert to the user portal 132. When the user portal receives the commission failure alert, the user portal 132 may open a support ticket by communicating with computing device 128. In another example, the edge compute server configuration tool 108 may log the alert directly with the computing device 128 via the support communicator 126. The test alert may be received by the computing device 128 and displayed on the support interface 130. The user may view the alert and/or support ticket when the computing device 128 displays the alert and/or support ticket in the support interface 130. The alert may include information about the server that failed testing, including the name of the server, the size of the server, the geographic location of the server, and/or why the server failed testing. The alert may allow the user to schedule and/or perform the maintenance necessary to ready the server for use, such as in-person maintenance of the server. The necessary maintenance can be performed in operation 330. Once the maintenance the server requires is complete, flow may proceed to operation 326 and the server may be exposed to the user portal. In some examples, the one or more tests that are unsuccessful may not indicate critical issues with the commissioned server. In these examples, flow may proceed to operation 326, and the server may be ready for use and be exposed to the user portal 132.

Figure 4:
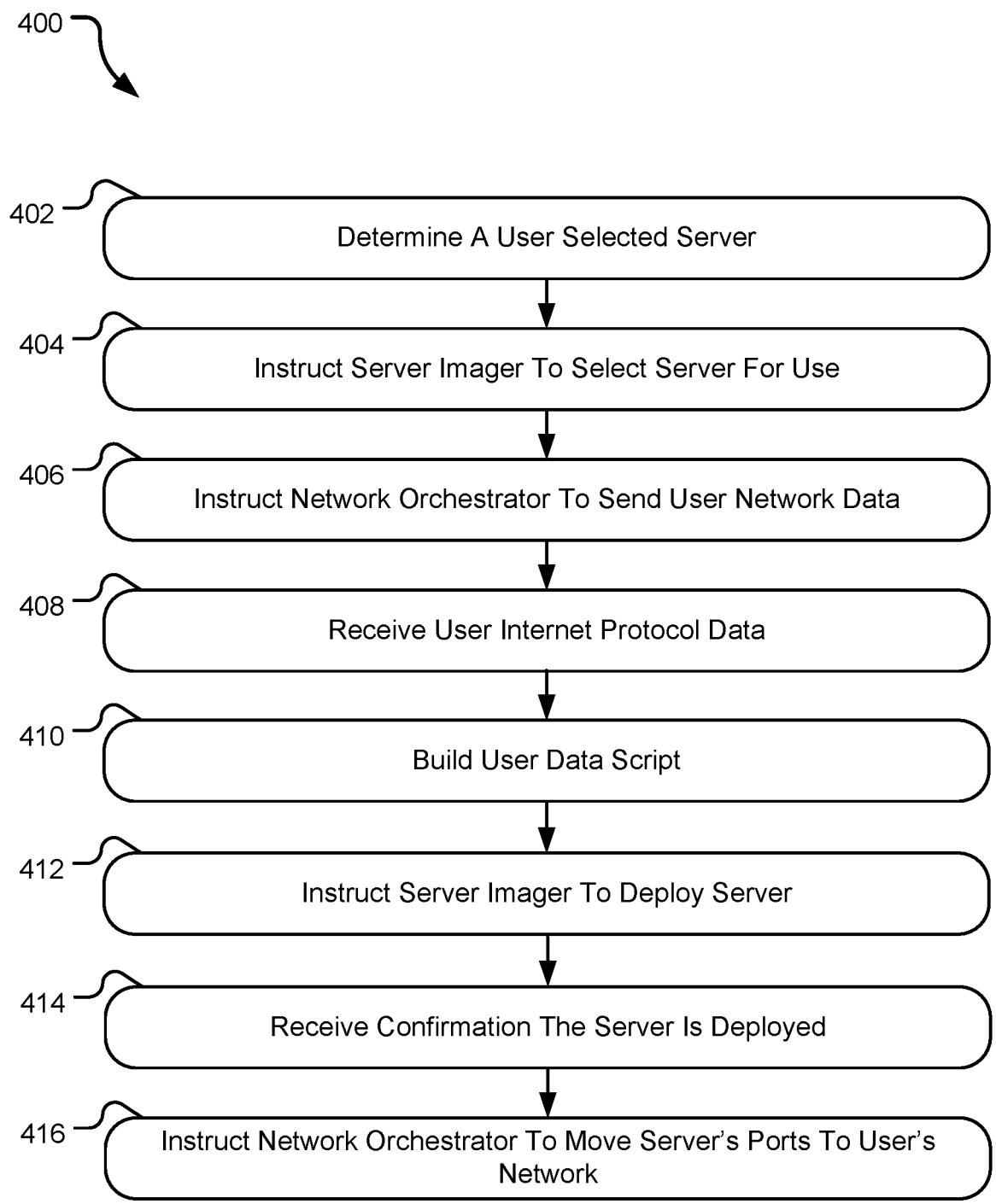
FIG. 4 is a flowchart illustrating a method for configuring a server for a particular user.

FIG. 4 is a flowchart illustrating a method 400 for configuring a server for a particular user. As discussed, one or more operations of method 400 may also be based on a particular server's determined state, and different operations of method 400 may be performed in parallel on different servers that are then detected to be in particular states. In examples, one or more of the operations of the method 400 may be performed by the user portal 132. In other implementations, one or more of the operations may be performed by other components of the edge compute server configuration tool 108 or still other systems. The operations may be executed by hardware components of the relevant systems, software programs of the systems, or a combination of hardware and software components of the system.

Beginning in operation 402, it is determined that a user has selected a server. In an example, the user selects the server via user interface 124. The server may be exposed to the user interface 124 by the user portal 132. The user portal 132 may communicate with the user interface 124 for determine that a user selects a server for use. In an example, the user may select a server based on the size of the server and/or other properties of the server the user desires to use.

Once it is determined that a user has selected a server, flow proceeds to operation 404, and a server imager is instructed to select a server for use. For example, the user portal 132 instructs the server imager 106 to select a server from the pool of servers available for use. The server imager 106 selects a server from the pool of servers available for use by selecting an available server with the properties the user desires. For example, the server imager 106 may use the size tag and location tag assigned to the server during commissioning of the server, such as the commissioning done in method 300 of FIG. 3A described above, to determine which server to assign to, and configure for, the user. The server imager 106 may use the size tag and location tag to find a server of the appropriate size that is closest to the user.

When the server is selected for use, flow proceeds to operation 406. In operation 406, a network orchestrator is instructed to send the user network data. For example, the user portal 132 instructs network orchestrator 134 to send information identifying the user network.

Flow proceeds to operation 408, and user Internet Protocol (IP) data is received. For example, the user portal 132 may receive the user IP data from the network orchestrator 134.

Once the user IP data is received, flow proceeds to operation 410. In operation 410, a user data script is built. For example, the user portal 132 may build the user data script. The user portal 132 may use a template, user supplied data, and the user IP data to build the user data script. In an example, the template is loaded onto the server before a user selects a server for use. In examples, the user supplied data is received by the user portal 132 from the computing device 122. The user may supply the data by inputting the data into the computing device 122 via the user interface 124.

After the user data script is built, flow proceeds to operation 412, and a server imager is instructed to deploy the server. For example, the user portal 132 may instruct the server imager 106 to deploy the server. In examples, the user portal 132 may also send the user data script to the server imager 106 for use during the server deployment. In examples, deploying the server includes powering on the server when the server is powered off. For example, the server imager 106 may use the IPMI power password to instruct the server's IPMI device to power on the server. The server imager 106 installs and configures the server with the user data script.

Once the sever imager is instructed to deploy the server, flow proceeds to operation 414. In operation 414, confirmation that the server is deployed is received. For example, the user portal 132 may receive confirmation that the server is deployed from the server imager 106. In an example, the user portal 132 polls the server imager 106 periodically to determine if the server has a "deployed" status.

Once confirmation that the server is deployed is received, flow proceeds to operation 416, and a network orchestrator is instructed to move at least some of the server's ports to the user's network. For example, the user portal 132 may instruct the network orchestrator 134 to cause the server's ports to be moved to the user's network, which may be a VLAN. Moving the server's ports to the user's network allows the user to access and use the server.

Figure 5:
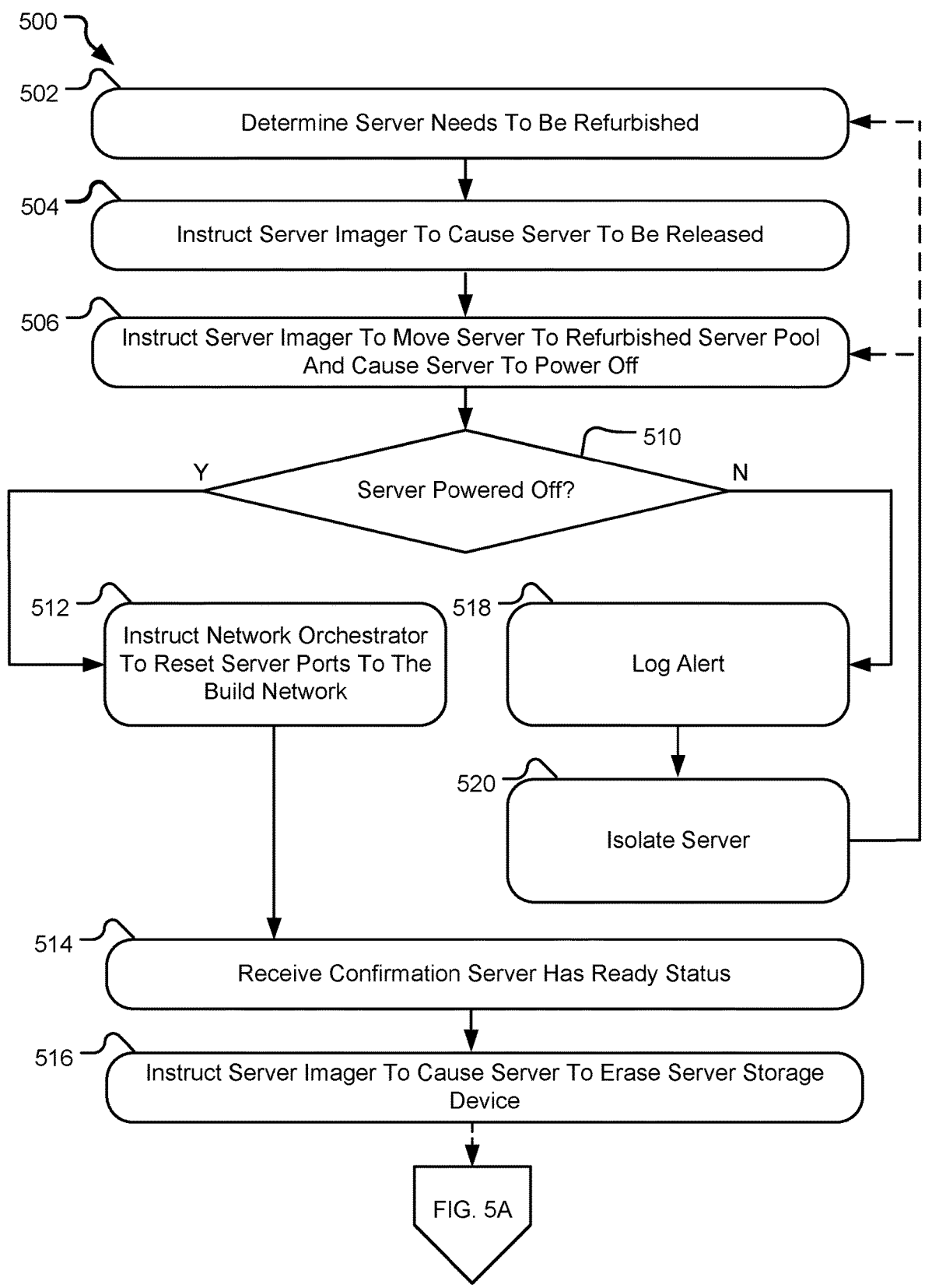
FIG. 5 is a flowchart illustrating a method for configuring a server to be refurbished after a customer has used a server.

FIG. 5 is a flowchart illustrating a method 500 for configuring a server to be refurbished after a customer has used a server. As discussed, one or more operations of method 500 may also be based on a particular server's determined state, and different operations of method 500 may be performed in parallel on different servers that are then detected to be in particular states. In examples, one or more of the operations of the method 500 may be performed by the edge compute server configuration application 112. In other implementations, one or more of the operations may be performed by other components of the edge compute server configuration tool 108 or still other systems. The operations may be executed by hardware components of the relevant systems, software programs of the systems, or a combination of hardware and software components of the system. Flow may proceed to different operations of method 500 based on a state of the server being refurbished.

Beginning in operation 502, it is determined that a server needs to be refurbished. For example, the user portal 132 may determine that a server needs to be refurbished when a user releases the server back into the available server pool. In an example, the user releases the server assigned to the user through the user interface 124 of computing device 122. The user portal 132 may communicate with the computing device 122 to determine that the user requests the server to be released, and therefore the server needs to be refurbished. The user portal 132 may determine multiple servers have been requested to be released and each server needs to be refurbished. The user portal 132 may begin refurbishing each server simultaneously. The server may be determined to have a "ready" status and be in a "dirty" pool, indicating that the server needs to be refurbished.

Flow then proceeds to operation 504, and a server imager is instructed to cause the server to be released. For example, the user portal 132 instructs the server imager 106 to cause the server to be released. Releasing the server may include revoking the user's access to the server and other operations.

Once the server is released, flow proceeds to operation 506. In operation 506, a server imager is instructed to move the server to a pool of refurbished servers and to cause the server to power off. For example, the edge compute server configuration tool 108 instructs the server imager 106 to cause the server to power off. The server imager 106 may use the IPMI power password that was set on the server's IPMI device during commissioning, such as in operation 312 shown in FIG. 3A, to instruct the IPMI device to power off the server. In some examples, the edge compute server configuration tool receives an instruction to cause the server to power off from the user portal 132. In some examples, the edge compute server configuration tool 108 communicates with the server imager 106 using the server imager communicator 114. Once the server is powered off, the server imager 106 may still communicate with and refurbish the server by communicating with the server's IPMI. By powering the server off, security is improved. For example, it is desirable to power off the server before moving the server from a public/user network to a private build network where it can be securely erased and imaged.

Flow then proceeds to operation 510, where it is determined whether the server is powered off. For example, the user portal 132 determines if the server is powered off by communicating with the server imager 106.

In some examples, the server may be determined to be powered on in operation 510. In these examples, flow proceeds to operation 518. In operation 518, an alert is logged. For example, the edge compute server configuration tool 108 may use the user portal communicator 118 to communicate with user portal 132 and report the failure to power off the server. The user portal 132 then opens a ticket or logs an alert by communicating with the computing device 128. The computing device displays the alert or ticket on support interface 130 for a user, such as a support person, to view the alert or ticket. In another example, the edge compute server configuration tool 108 may use the support communicator 126 to communicate directly with computing device 128 to alert a support person. The support person may receive the alert in the support interface 130. The alert may include information about the server including the name of the server, the size of the server, the geographic location of the server, and/or why the server failed to power off. The support person may then fix the server so the server may be refurbished.

In some examples, flow then proceeds to operation 520, and the server is isolated. For example, the edge compute server configuration tool 108 may instruct the server imager 106 to cause the server that failed to power off to be isolated from the edge compute environment and/or network. The server imager 106 may cause the server to isolate to prevent the server from spreading malicious software that may be stored on the server and/or prevent the server from otherwise interfering with the operation of the edge compute environment, networks, and the other servers in the one or more networks associated with the edge compute environment. In some examples, the server imager 106 may cause the server to isolate by causing any data ports the server has to be turned off.

Once the maintenance required by the server is completed, the server may be able to be refurbished. Flow then proceeds back to operation 502 or 506 based on the reason(s) the server failed to power off.

In other examples, the server is determined at operation 510 to be powered off. In these examples, flow proceeds to operation 512, and a network orchestrator is instructed to reset the server's ports to the build network. For example, the user portal 132 instructs the network orchestrator 134 to reset the server's ports to the build network. In examples, the server is moved to the build network to allow the server to be imaged securely within the build network.

Once the network orchestrator is instructed to reset the server's ports to the build network, flow proceeds to operation 514. In operation 514, confirmation is received that the server is ready to be refurbished. For example, the edge compute server configuration tool 108 may poll the server imager 106 periodically via the server imager communicator 114 to receive confirmation that the server is ready to be refurbished. In examples, the edge compute server configuration tool 108 polls the server imager 106 periodically to identify servers that have a "ready" status in the pool of refurbished servers. In an example, servers with a "ready" status in the pool of refurbished servers indicates the server has been released, powered off, and the server ports have been reset to the build network.

Once confirmation that the server has a "ready" status is received, flow proceeds to operation 516. In operation 516, a server imager is instructed to erase one or more of the server's storage devices. For example, the edge compute server configuration tool 108 may instruct the server imager 106 to cause the server to erase one or more of the server's storage devices. In examples, the storage devices may be removable storage and/or non-removeable storage. Examples of removable data storage include Compact Disc Read-Only Memory (CD-ROM), Digital Versatile Disc Read-Only Memory (DVD-ROM), magneto-optical disks, flash drives, and the like. Examples of non-removable data storage include internal magnetic hard disks, SSDs, and the like. The one or more storage devices may include volatile memory (e.g., dynamic random access memory (DRAM), static random access memory (SRAM), etc.) and/or non-volatile memory (e.g., read-only memory (ROM), flash memory, etc.). In some examples, the server imager 106 and the edge compute server configuration tool 108 may be unable to access the one or more storage devices until they are erased. This may allow user data to be protected by preventing access to the data.

Figure 5A:
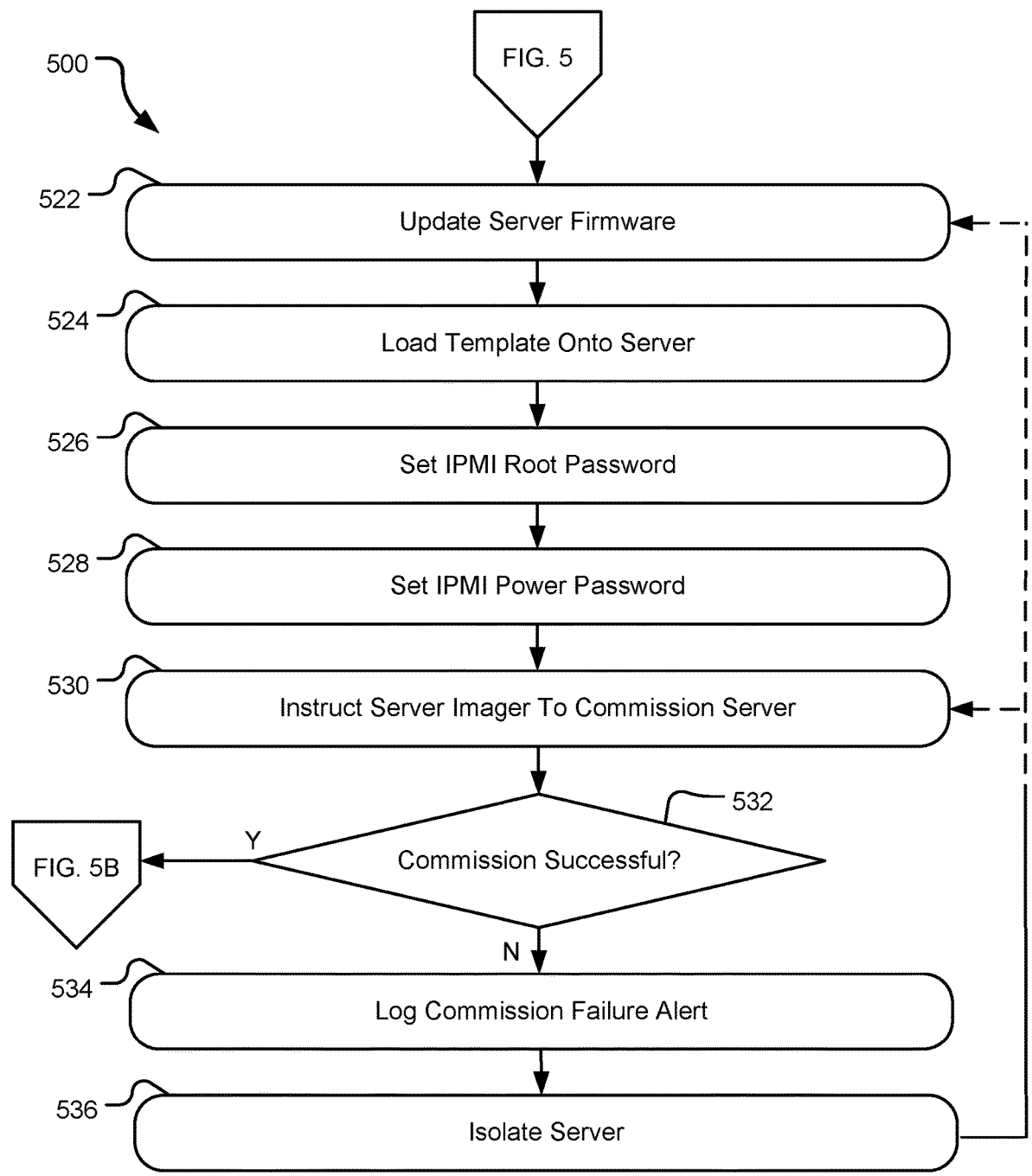
FIG. 5A is a flowchart illustrating a method for configuring a server to be refurbished after a customer has used a server.

In examples, the server is commissioned for use and method 500 proceeds to FIG. 5A. FIG. 5A is a flowchart illustrating a continuation of the method 500 for configuring a server to be ready for use.

Beginning in operation 522, the firmware for one or more components of the server needing commissioning may be updated. For example, the previous user may have altered the firmware of one or more components of the server. The firmware of the server is updated to the firmware desired for servers that are ready for a new user. As described above with respect to operation 306 of method 300, the edge compute server configuration tool 108 determines the desired firmware for one or more components of the server in some examples. In other examples, the edge compute server configuration tool 108 may also utilize a data source 120 of the computer readable media 110 for storage of data and information. The edge compute server configuration application 112 may store the desired firmware for one or more components of a server in a network associated with the edge compute environment. The edge compute server configuration tool 108 compares the desired firmware for the one or more components of the server to the firmware installed on the components to determine which components to update. The edge compute server configuration tool 108 will then cause the determined components of the server to update to the desired firmware. For example, the server configuration generator 116 may determine the existing firmware for any components of the server needing commissioning and generate and/or retrieve the desired firmware for the components of the server needing commissioning. If a component of the server needing configuration does not have the desired firmware version, the server configuration generator 116 can cause the desired firmware of the server component to be uploaded or updated. In some examples, the server configuration generator 116 communicates with the server imager 106 to upload or alter the firmware of the server components. The server configuration generator 116 may indicate which components of the server need to be altered to the server imager 106. The server imager 106 may then alter the firmware of the server components.

In operation 524, a template is loaded onto the server needing commissioning. For example, the edge compute server configuration tool 108 may cause a template to be loaded on one or more of the servers 102*a-c*. In some examples, the template is a golden image. The golden image may be loaded onto the IPMI device on the server. For example, where Dell brand servers are used, the edge compute server configuration tool 108 loads an iDRAC golden image onto the iDRAC device on the server. In further examples, operation 522 and 524 may be combined into a single operation, and the template includes the desired firmware for the one or more components of the server. The loaded template may replace the firmware of the server with the desired firmware.

Flow then proceeds to operation 526 and an IPMI root password is set. For example, the edge compute server configuration tool 108 may set an IPMI root password that is needed to communicate with and access the server needing configuration. Specifically, the server configuration generator 116 may set the password to a standard password that is used to access the IPMI device of the server. In one example, the server imager 106 has the standard IPMI root password to communicate with the server. In another example, the server configuration generator 116 may provide the password to the server imager 106 via the server imager communicator 114 so the server imager 106 may communicate with and configure the server.

Once the server password is created, flow proceeds to operation 528. In operation 528, an IPMI power password is set. For example, the edge compute server configuration tool 108 may set an IPMI power password that is needed to power the server on and off. In an example, the edge compute server configuration tool 108 instructs the server imager 106 to send an IPMI power password that the server imager 106 stores. The edge compute server configuration tool 108 may set the IPMI power password to the IPMI power password received from the server imager 106, allowing the server imager 106 to power the server on and off.

Flow proceeds to operation 530, and a server imager is instructed to commission the server. For example, the edge compute server configuration tool 108 instructs the server imager 106, via the server imager communicator 114, to commission the server. Commissioning the server may include configuring the server, collecting information about the server, and other operations. In an example, commissioning the server includes powering on the server. For example, the server imager 106 may use the IPMI power password to power on the server. The server may be powered on during commissioning because the server is powered off in operation 506. In some examples, commissioning the server includes collecting information of the size of the server, the server's geographic location, and information on the physical ports and cabling of the server. In another example, the refurbished server has been commissioned previously such as through the operations of method 300. The information may have been collected previously when the server was commissioned previously, so commissioning the server will not include collecting information.

When the server is commissioned, flow proceeds to operation 532, and it is determined, e.g., by the edge compute server configuration tool 108, whether the server is commissioned. In some examples, the edge compute server configuration tool 108 receives the confirmation by polling the server imager 106. The server imager 106 may assign the commissioned server a "ready" status after commissioning concludes or a "commission failed" status if commissioning is unsuccessful. The server imager communicator 114 may poll the server imager 106 to identify one or more servers that have the "ready" or the "commission failed" status. For example, the server imager communicator 114 may poll the server imager 106 every minute to check for servers having a "ready" or "commission failed" status.

If the commission is unsuccessful and the server has the "commission failed" status, flow proceeds to operation 534. For example, the server imager 106 may give a server that the server imager 106 could not commission the "commission failed" status. The server may fail commissioning for several reasons. For example, a disk may have failed in the server, there may be malicious software installed on the server, and/or other physical or software related failures. The edge compute server configuration tool 108 may identify the servers with a "commission failed" status when the edge compute server configuration tool 108 polls the server imager 106 via the server imager communicator 114.

In operation 534, a commission failure alert is logged. For example, when the edge compute server configuration tool 108 discovers servers with a "commission failed" status, the edge compute server configuration tool 108 may log the alert by sending the commission failure alert to the user portal 132. When the user portal receives the commission failure alert, the user portal 132 may open a support ticket by communicating with computing device 128. In another example, when the edge compute server configuration tool 108 discovers servers with a "commission failed" status, the edge compute server configuration tool 108 may communicate directly with computing device 128, via the support communicator 126, to log the issue and/or alert a user of the computing device 128, such as by opening a support ticket. The user may view the alert and/or support ticket when the computing device 128 displays the alert and/or support ticket in the support interface 130. The alert may include information about the server that failed commissioning, including the name of the server, the size of the server, the geographic location of the server, and/or why the server failed to commission. The alert may allow the user to schedule and/or perform the maintenance necessary to continue configuring the server for use, such as in-person maintenance of the server.

Once commission failure alert is logged, flow proceeds to operation 536, and the server is isolated. For example, the edge compute server configuration tool 108 instructs the server imager 106 to cause the server to be isolated from the edge compute environment and/or network. The server imager 106 may cause the server to be isolated to prevent the server from spreading malicious software that may be stored on the server and/or prevent the server from otherwise interfering with the operation of the edge compute environment, the networks, and the other servers in the servers associated with the edge compute environment. In some examples, the server imager 106 may isolate the server by causing any data ports the server has to be turned off.

Once the maintenance the server requires is completed, the server may be commissioned again. For example, the server imager 106 may reattempt to commission the server. Flow proceeds back to 520 or 530 based on the reason(s) the commissioning failed. In some examples, some steps of method 500 that were previously completed may be omitted based on the reason(s) the server required maintenance when flow proceeds back to operation 522.

Referring back to operation 530, the edge compute server configuration tool 108 has confirmation that the server is commissioned when the server has the "ready" status. If the edge compute server configuration tool 108 determines that the server has the "ready" status, flow proceeds to FIG. 5B.

Figure 5B:
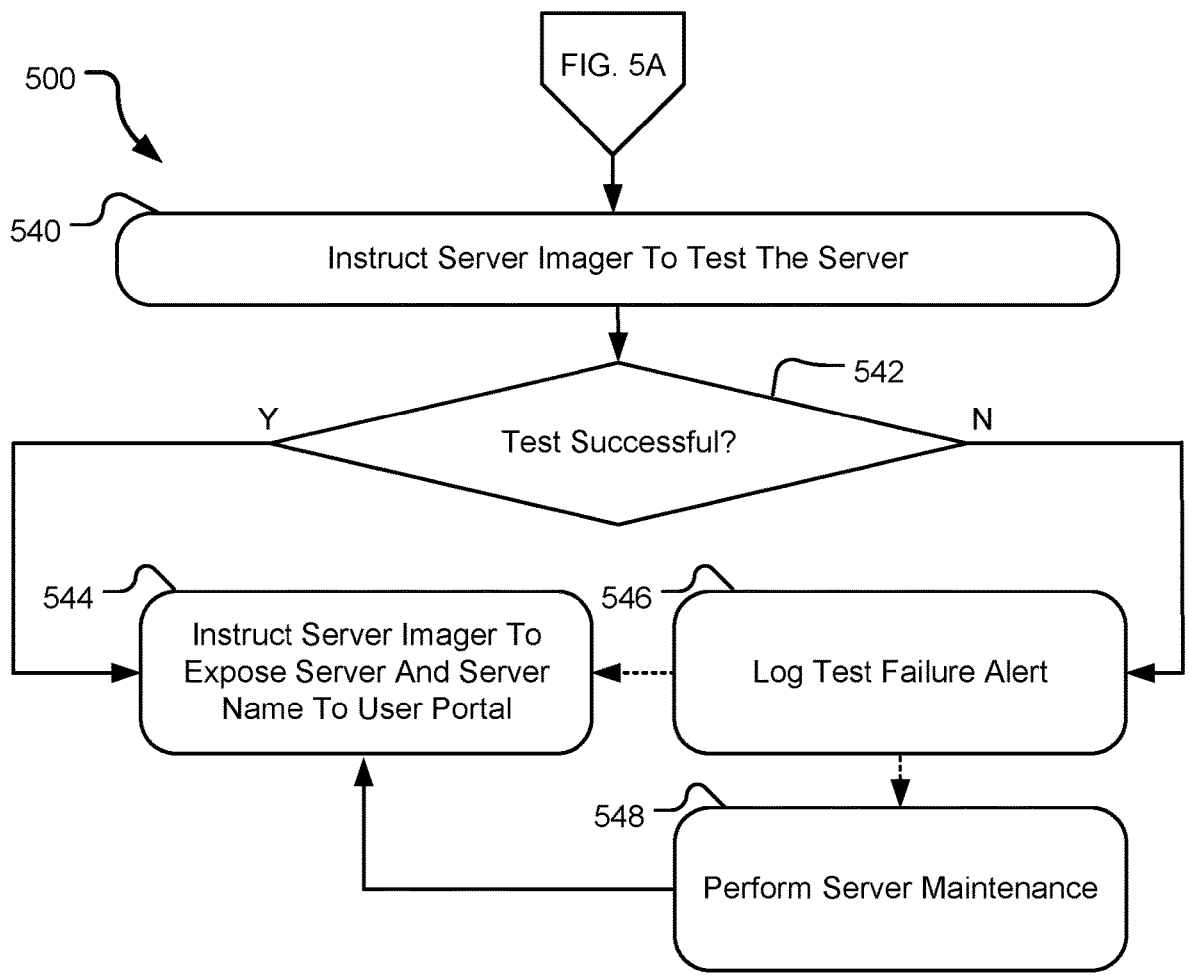
FIG. 5B is a flowchart illustrating a method for configuring a server to be refurbished after a customer has used a server.

FIG. 5B is a flowchart illustrating the continuing method 500 for configuring a server to be ready for use. Once the server is determined to be commissioned successfully, flow then proceeds to operation 540. In operation 540, a server imager is instructed to test the server. For example, the edge compute server configuration tool 108 instructs the server imager 106 to test the commissioned server. The server imager 106 may run one or more tests on the server. In some examples, the server imager 106 may test the memory of the server, including nonvolatile memory and/or volatile memory, test the disks of the server, test the physical ports and cabling of the server, cause the server to perform burn-in tests, and/or other hardware tests.

Once the tests are complete, flow proceeds to operation 542, where it is determined whether the one or more tests are successful. For example, the edge compute server configuration tool 108, via the server imager communicator 114, may poll the server imager 106 to determine if the one or more tests are successful.

If the one or more tests are successful, flow proceeds to operation 544. In operation 544, a server imager is instructed to expose the configured server to a user portal. For example, the edge compute server configuration tool 108 may instruct the server imager 106 to expose the server and server name to the user portal 132. This may allow a user of the user interface 124 to select the configured server for use. In some examples, the user portal communicator 118 may expose the server by communicating with the user portal 132. In other examples, the edge compute server configuration tool 108 may instruct the server imager 106 to move the server to a pool of available servers. The user portal 132 may select a server from the pool of available servers when a user selects a server for use.

If the one or more tests are not successful, flow proceeds to operation 546. In operation 546 a test failure alert is logged. For example, the edge compute server configuration tool 108 may log the alert by sending the test failure alert to the user portal 132. When the user portal receives the commission failure alert, the user portal 132 may open a support ticket by communicating with computing device 128. In another example, the edge compute server configuration tool 108 may log the alert directly with the computing device 128 via the support communicator 126. The test alert may be received by the computing device 128 and displayed on the support interface 130. The user may view the alert and/or support ticket when the computing device 128 displays the alert and/or support ticket in the support interface 130. The alert may include information about the server that failed testing, including the name of the server, the size of the server, the geographic location of the server, and/or why the server failed testing. The alert may allow the user to schedule and/or perform the maintenance necessary to ready the server for use, such as in-person maintenance of the server. The necessary maintenance can be performed in operation 548. Once the maintenance the server requires is complete, flow may proceed to operation 544 and the server may be exposed to the user portal.

In some examples, the one or more tests that are unsuccessful may not indicate critical issues with the commissioned server. In these examples, flow may proceed to operation 544, and the server may be ready for use and be exposed to the user portal 132.

Figure 6B:
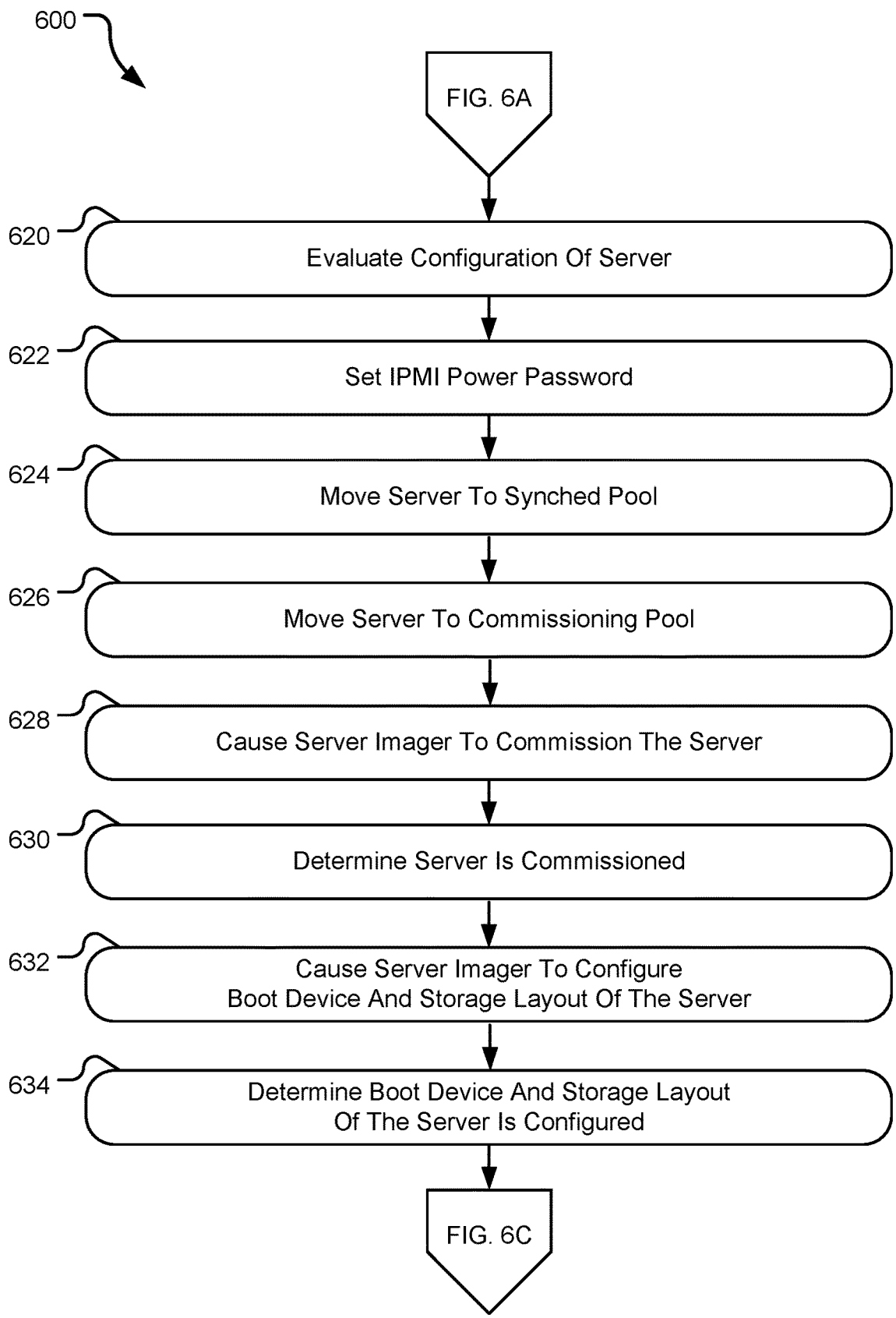
FIG. 6B is a flow chart illustrating a method for autonomously moving a server through various configuration stages according to detected server states.
Figure 6C:
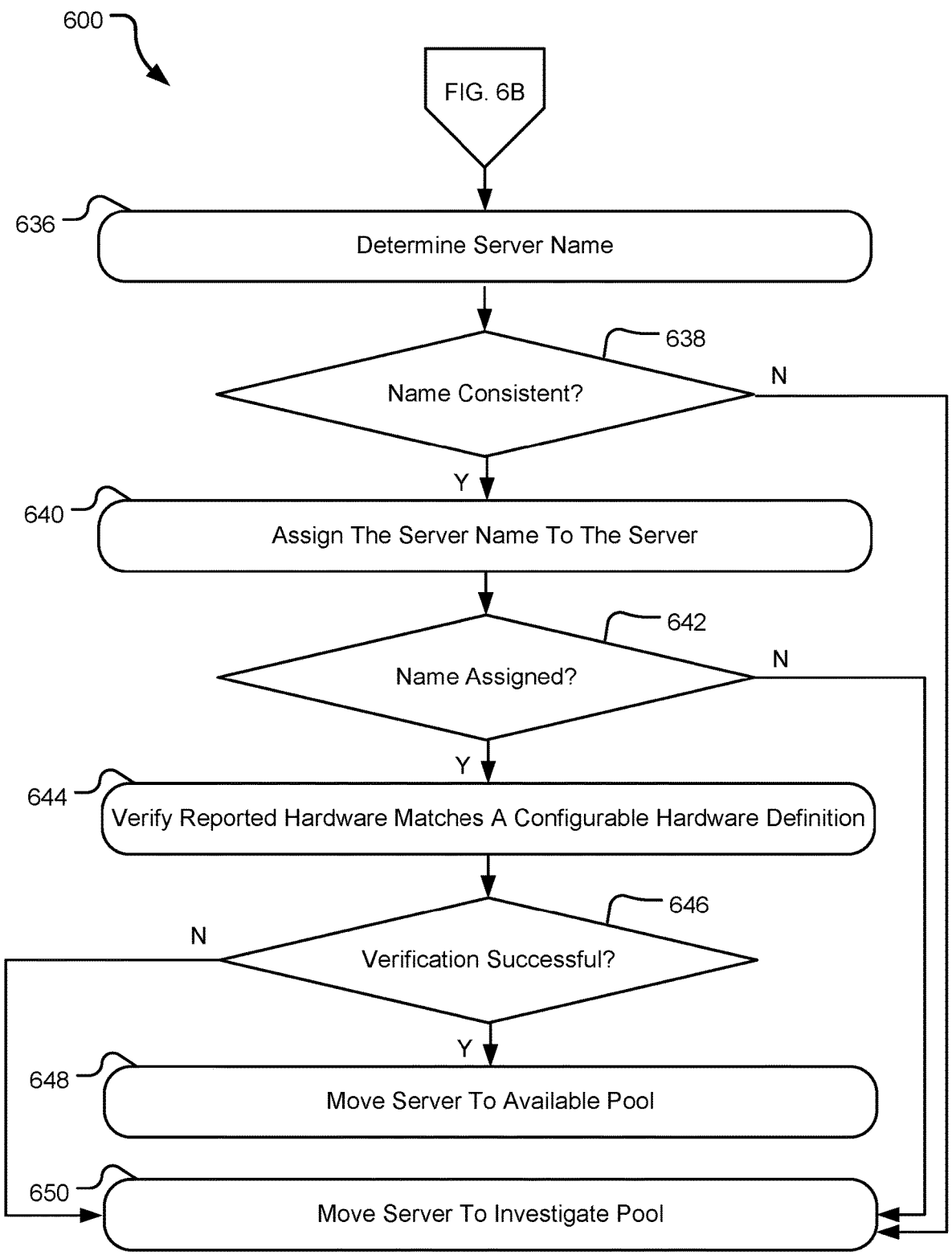
FIG. 6C is a flow chart illustrating a method for autonomously moving a server through various configuration stages according to detected server states.

FIGS. 6A-6C comprise a flowchart illustrating an example method 600 for configuring a server to be ready for use by autonomously moving server(s) through various configuration stages according to detected server state(s). In one implementation, one or more of the operations of the method 600 may be performed by the edge compute server configuration tool 108, including the edge compute server configuration application 112. In other implementations, one or more of the operations may be performed by other components of the edge compute server configuration tool 108 or still other systems. The operations may be executed by hardware components of the relevant systems, software programs of the systems, or a combination of hardware and software components of the system. In examples, the edge compute server configuration tool 108 acts as a state engine. Flow may proceed to different operations of the method 600 based on the state of the one or more servers being configured. For example, the different server pools discussed in method 600, along with the status of the servers, may indicate the state of the servers. In some examples, only the status or only the pool will define the server state (e.g., all servers with a particular status regardless of pool or all servers in a particular pool regardless of status). In other examples, other information in addition to the server's status and pool may be used to determine a server state.

As discussed, in examples, the edge compute server configuration tool 108 acting as a state engine means that the workflow is a product of changes to the machines against which edge compute server configuration tool 108 operates, and not a rigidly defined entity in its own right. In examples, this design has several advantages: (a) the state engine design forces the pre-requisites of all actions to be identified and defined; (b) the design ensures actions are not taken against a machine which does not meet the previously mentioned prerequisites; and (c) multiple non-conflicting actions may be performed in parallel. An additional advantage of the state engine design is that states that do not directly drive actions through the edge compute server configuration tool 108 can, nonetheless, be defined and reported on. In addition, both the server states and the actions taken with respect to servers determined to be in those states may be configurable through a user interface.

The operations of method 600 may occur simultaneously for different servers. For example, the edge compute server configuration tool 108 may perform the operations of method 600 by checking the state of all servers in the network. The states of the servers may indicate that some servers should have operation 606 performed, some servers should have operation 610 performed, some servers should have operation 612 performed, and so on, all based on the same check performed by the edge compute server configuration tool 108.

Referring to FIG. 6A, method 600 begins at operation 602, and it is determined that a server needs commissioning. For example, the edge compute server configuration tool 108 determines that a server, such as one of servers 102a-c, needs commissioning. In one example, the server is a new server. The new server will have a "new" status and be in a "default" pool. In another example, the server is a server released by the user. The released server will have a "ready" status in a "dirty" pool. The edge compute server configuration tool 108 can continuously poll the server imager 106 to determine the state of the servers. For example, the edge compute server configuration tool 108 polls the server imager 106 every five minutes to determine the states of the servers. In examples, the edge compute server configuration tool 108 can determine that multiple servers need commissioning and begin the commissioning process for every server simultaneously or substantially simultaneously.

Flow proceeds to operation 604, and the server is moved to a cleaning pool. For example, the edge compute server configuration tool 108 moves the server to the cleaning pool. Moving the server to a pool means updating the server so that it correctly identifies the pool to which it is assigned when a device accesses the server to check its current pool. For example, the pool and/or status is an assigned value that the server stores so that the server state can be identified when the server is polled. One or more new servers and released servers may be moved to the cleaning pool.

Flow proceeds to operation 606, and the server IPMI device is erased. For example, the edge compute server configuration tool 108 polls the servers and identifies all servers in the cleaning pool. All servers in the cleaning pool will have the associated IPMI device erased. The edge compute server configuration tool 108 can instruct the server imager 106 to cause the IPMI device, such as IPMIs 104a-c, to be erased.

Once the IPMI device is erased, the server is moved to the erased pool in operation 608. For example, the edge compute server configuration tool 108 moves the server to the erased pool. In another example, the edge compute server configuration tool 108 instructs the server imager 106 to move the server to the erased pool.

Flow proceeds to operation 610, and it determined what firmware should be installed on the server. For example, the edge compute server configuration tool 108 polls the servers and identifies all servers in the erased pool to determine which servers need firmware installed. The edge compute server configuration tool 108 determines what firmware should be installed on each server in the erased pool.

Once the firmware is determined, flow proceeds to operation 612 and the server IPMI device is instructed to install the firmware. For example, the edge compute server configuration tool 108 causes the server IPMI device to install the firmware.

Once the firmware is successfully installed, the server is moved to the updated pool in operation 614, such as by the edge compute server configuration tool 108. Flow then proceeds to operation 616, and the IPMI device is instructed to import a configuration file. For example, the edge compute server configuration tool 108 instructs the server's IPMI device, such as IPM Is 104*a-c*, to import the configuration file for any server determined to be in the updated pool. The configuration file may be determined to be used by server configuration generator 116 and stored in data source 120.

Once the configuration file is imported, flow proceeds to operation 618 and the server is moved to the configured pool, such as by the edge compute server configuration tool 108. The method 600 then continues in FIG. 6B.

FIG. 6B is a flowchart illustrating additional operations of a method 600. In operation 620 the configuration of the server is evaluated. For example, the edge compute server configuration tool 108 polls the servers and identifies all servers in the configured pool to determine which servers should be evaluated. The edge compute server configuration tool 108 evaluates the configuration of each server in the configured pool. For example, the edge compute server configuration tool 108 compares the configuration with a determined configuration stored in data store 120.

Once the configuration of the server is evaluated, the IPMI power password is set in operation 622. For example, the edge compute server configuration tool 108 checks whether the server imager 106 has the same IPMI power password as the server. In an example, the edge compute server configuration tool 108 instructs the server imager 106 to send an IPMI power password that the server imager 106 stores if the IPMI passwords do not match. The edge compute server configuration tool 108 may set the IPMI power password to the IPMI power password received from the server imager 106, allowing the server imager 106 to power the server on and off.

Upon successful completion of operation 622, the server is moved to the synched pool in operation 624, such as by the edge compute server configuration tool 108. For any machine determined to be in the synched pool, in operation 626, the server is moved to the commissioning pool, such as by the edge compute server configuration tool 108. For example, the edge compute server configuration tool 108 polls the servers to determine which servers are in the synched pool and should be moved to the commissioning pool.

In operation 628, a server imager is caused to commission the server. For example, the edge compute server configuration tool 108 causes the server imager 106 to commission the servers in the commissioning pool.

Flow proceeds to operation 630, and it is determined that the server is commissioned. For example, the servers in the commissioning pool and undergoing commissioning have a "commissioning" status. Once the server imager 106 completes commissioning the server, the servers in the commissioning pool are assigned a "commissioned" status. The edge compute server configuration tool 108 will determine the server is commissioned by polling the servers to determine the server is in the commissioning pool and has a "commissioned" status.

Once the server is commissioned, flow proceeds to operation 632. In operation 632, a server imager is caused to configure a boot device of the server and configure the storage layout of the server. For example, the edge compute server configuration tool 108 causes the server imager 106 to configure the boot device and storage layout of any server with a ready status in the commissioning pool. The boot device is a device that includes the software and/or files required to boot the server. The boot device may be part of the server or a separate device. The server imager 106 configures the boot device so the server will boot correctly and/or as desired. The storage layout of the machine may vary based characteristics of the server and/or the configuration of the server. For example, the storage layout is determined by the server configuration generator 116.

In operation 634, it is determined that the boot device and storage layout of the server is configured. For example, the edge compute server configuration tool 108 evaluates the boot device to determine that the boot device is configured. The server is assigned a "layout configuring" status while the server imager configures the storage layout of the server and assigned a "ready" status when the configuration is complete. The edge compute server configuration tool 108 checks the status of the server to determine the configuration is complete. Method 600 then continues to FIG. 6C.

FIG. 6C is a flowchart illustrating additional operations of a method 600. In operation 636, a server name is determined. For example, for servers in the commissioning pool with a status of ready and a particular boot disk value, the edge compute server configuration tool 108 determines the name based on information the server reports about the server and/or one or more network components to which the server is connected. For example, the server imager 106 receives the information from the server while commissioning the server and communicates it to the edge compute server configuration tool 108. Information needed to calculate a name correctly may include link layer discovery protocol neighbor data.

In operation 638, it is determined whether the name is consistent. For example, the edge compute server configuration tool 108 determines if the data regarding the devices to which a server is connected resulted either in inconsistent name calculations or the complete inability to calculate a name. If the data results in an inconsistent name calculation or failure to calculate a name, flow proceeds to operation 650 and the server is moved, such as by the edge compute server configuration tool 108, to the investigate pool. The investigate pool indicates that there is an issue with the server that may require maintenance. For example, the failure to create a consistent name indicates one or more issues with the physical connection of devices. In an example, the server may have a configurable "naming" status when it is moved to the investigate pool. The status may help diagnose the maintenance required to remedy the issue with the server.

If the server name is consistent, the server name is assigned to the server in operation 640. For example, the edge compute server configuration tool 108 causes the server imager 106 to assign the name to the server. In operation 642, it is determined whether the name is assigned correctly. If the name is not assigned, the server is moved to the investigate pool in operation 650.

If the name is assigned to the server, it is verified that the reported hardware matches a configurable hardware definition in operation 644. For example, the edge compute server configuration tool 108 verifies that the hardware reported by the server imager 106 matches a configurable hardware definition, such as one created by the server configuration generator 116 and/or stored in data store 120. The configurable hardware definitions can be created using predicted server characteristics and/or predicted server connections.

In operation 646, it is determined whether the verification in operation 644 is successful. For example, the edge compute server configuration tool 108 determines whether it was able to successfully verify the reported hardware matches a configurable hardware definition. If the verification is not successful, the server is moved to the investigate pool in operation 650.

If the verification is successful, the server is moved to the available pool in operation 648, such as by the edge compute server configuration tool 108. Servers in the available pool are available to be used by new users.

Figure 7:
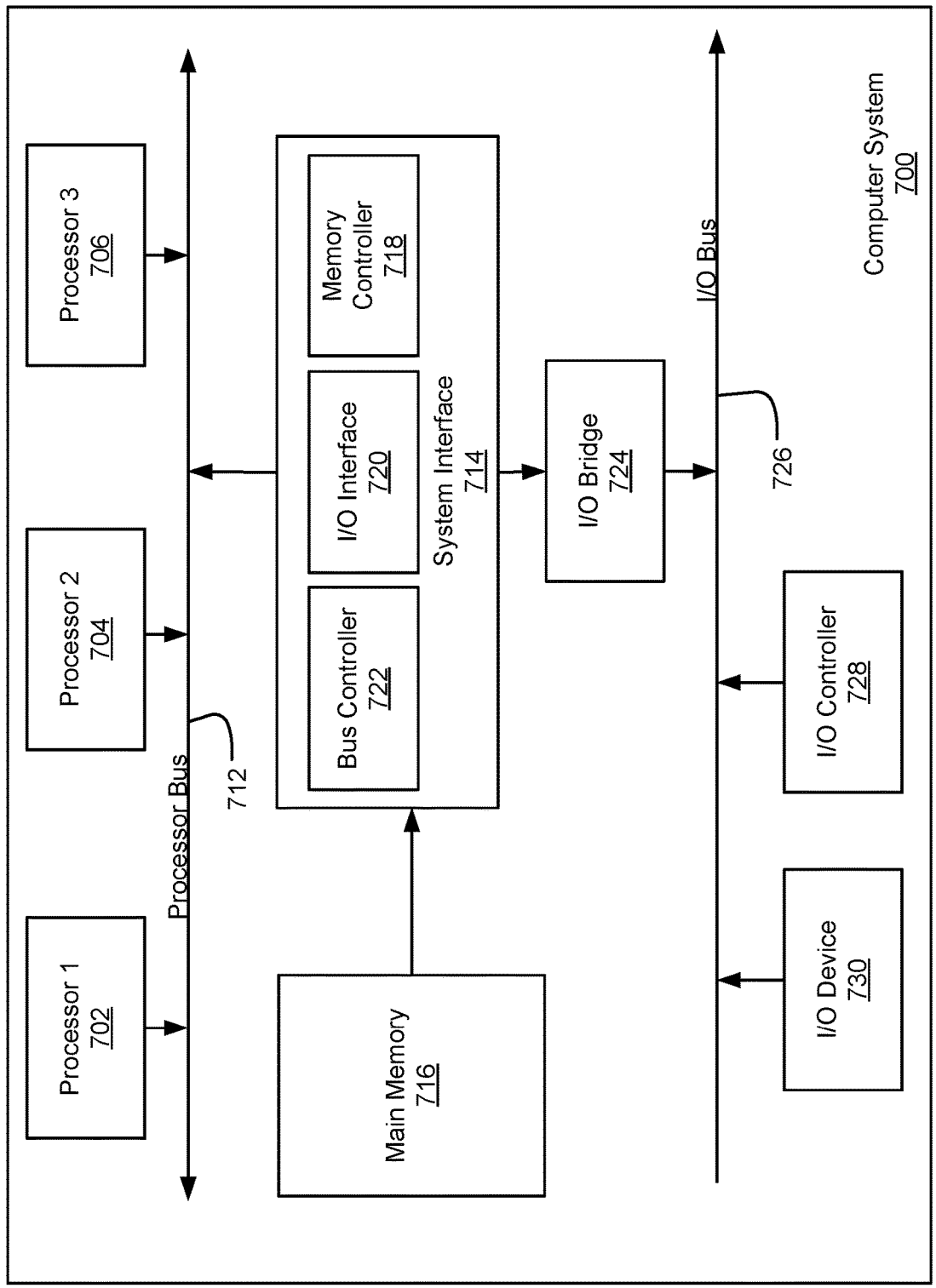
FIG. 7 is a diagram illustrating an example of a computing system which may be used in implementing examples of the present disclosure.

FIG. 7 is a block diagram illustrating an example of a computing device or computer system 700 which may be used in implementing the examples of the components of the network disclosed above. For example, the computing system 700 of FIG. 7 may be the computing device 122 or 128 discussed above. The computer system (system) includes one or more processors 702-706. Processors 702-706 may include one or more internal levels of cache (not shown) and a bus controller or bus interface unit to direct interaction with the processor bus 712. Processor bus 712, also known as the host bus or the front side bus, may be used to couple the processors 702-706 with the system interface 714. System interface 714 may be connected to the processor bus 712 to interface other components of the system 700 with the processor bus 712. For example, system interface 714 may include a memory controller 714 for interfacing a main memory 717 with the processor bus 712. The main memory 716 typically includes one or more memory cards and a control circuit (not shown). System interface 714 may also include an input/output (I/O) interface 720 to interface one or more I/O bridges or I/O devices with the processor bus 712. One or more I/O controllers and/or I/O devices may be connected with the I/O bus 726, such as I/O controller 728 and I/O device 730, as illustrated.

I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may include a dynamic storage device, referred to as main memory 716, or a random access memory (RAM) or other computer-readable devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706. The system set forth in FIG. 7 is but one possible example of a computer system that may employ or be configured in accordance with aspects of the present disclosure.

According to one example, the above techniques may be performed by computer system 700 in response to processor 704 executing one or more sequences of one or more instructions contained in main memory 716. These instructions may be read into main memory 716 from another machine-readable medium, such as a storage device. Execution of the sequences of instructions contained in main memory 716 may cause processors 702-706 to perform the process steps described herein. In alternative examples, circuitry may be used in place of or in combination with the software instructions. Thus, examples of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available through a wired or wireless network architecture with such computer program products, including one or more database management products, web server products, bare metal server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 716, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Examples of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Various modifications and additions can be made to the exemplary examples discussed without departing from the scope of the present invention. For example, while the examples described above refer to particular features, the scope of this invention also includes examples having different combinations of features and examples that do not include all of the described features. Accordingly, the scope of the present invention is intended to embrace all such alternatives, modifications, and variations together with all equivalents thereof.

While specific implementations are discussed, it should be understood that this is done for illustration purposes only. A person skilled in the relevant art will recognize that other components and configurations may be used without parting from the spirit and scope of the disclosure. Thus, the description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and such references mean at least one of the examples.

Reference to "one example" or "an example" means that a particular feature, structure, or characteristic described in connection with the example is included in at least one example of the disclosure. The appearances of the phrase "in one example" in various places in the specification are not necessarily all referring to the same example, nor are separate or alternative examples mutually exclusive of other examples. Moreover, various features are described which may be exhibited by some examples and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various examples given in this specification.

Without intent to limit the scope of the disclosure, examples of instruments, apparatus, methods, and their related results according to the examples of the present disclosure are given above. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure are set forth in the description, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

We claim:

1. A method of managing servers, the method comprising:
   receiving, through a user interface, a definition of multiple server states;
   receiving, through the user interface, a defined configuration operation for each of the multiple server states;
   determining, by a server configuration tool, multiple states of a plurality of servers;
   determining, for each of the plurality of servers, one of the defined configuration operations to be performed based on the determined multiple states of the plurality of servers, including determining that a first server is in a first server state while a second server is in a second server state; and
   instructing, by the server configuration tool, a server imager to perform, in parallel, a first configuration operation on the first server based on the first server state and a second configuration action on the second server based on the second server state.

2. The method of claim 1, wherein receiving the definition of multiple server states comprises receiving, for each of the server states, at least a server status and a server pool.

3. The method of claim 1, further comprising:
   receiving, through the user interface, a definition of a new server state;
   receiving, through the user interface, a definition of a new configuration operation for the new server state;
   re-determining, by the server configuration tool, multiple states of the plurality of servers; and
   when a third server is determined to be in the new server state, causing the new configuration operation to be performed on the third server.

4. The method of claim 1, further comprising:
   receiving, through the user interface, a definition of a new server state;
   receiving, through the user interface, a definition of a reporting operation for the new server state;
   re-determining, by the server configuration tool, multiple states of the plurality of servers;
   when a third server is determined to be in the new server state, causing the reporting operation to be performed.

5. The method of claim 1, further comprising:
   causing the multiple states of the plurality of servers to be re-determined, including determining that the first server is in the second server state; and
   instructing, by the server configuration tool, the server imager to perform the second configuration action on the first server based on the re-determined first server state.

6. The method of claim 5, wherein the multiple states of the plurality of servers are re-determined automatically and periodically.

7. The method of claim 5, wherein causing the multiple states of the plurality of servers to be re-determined further includes determining that the second server is in a third server state, further comprising:
   instructing, by the server configuration tool, the server imager to perform a third configuration action on the second server based on the re-determined second server state.

8. A non-transitory computer readable medium, storing instructions that, when executed by at least one processor, cause the at least one processor to perform a method, the method comprising:
   receiving, through a user interface, a definition of multiple server states;
   receiving, through the user interface, a defined configuration operation for each of the multiple server states;
   determining, by a server configuration tool, multiple states of a plurality of servers;
   determining, for each of the plurality of servers, one of the defined configuration operations to be performed based on the determined multiple states of the plurality of servers, including determining that a first server is in a first server state while a second server is in a second server state; and instructing, by the server configuration tool, a server imager to perform, in parallel, a first configuration operation on the first server based on the first server state and a second configuration action on the second server based on the second server state.

9. The non-transitory computer readable medium of claim 8, wherein receiving the definition of multiple server states comprises receiving, for each of the server states, at least a server status and a server pool.

10. The non-transitory computer readable medium of claim 8, wherein the method further comprises:
   receiving, through the user interface, a definition of a new server state;
   receiving, through the user interface, a definition of a new configuration operation for the new server state;
   re-determining, by the server configuration tool, multiple states of the plurality of servers; and
   when a third server is determined to be in the new server state, causing the new configuration operation to be performed on the third server.

11. The non-transitory computer readable medium of claim 8, wherein the method further comprises:
   receiving, through the user interface, a definition of a new server state;
   receiving, through the user interface, a definition of a reporting operation for the new server state;
   re-determining, by the server configuration tool, multiple states of the plurality of servers;
   when a third server is determined to be in the new server state, causing the reporting operation to be performed.

12. The non-transitory computer readable medium of claim 8, wherein the method further comprises:
   causing the multiple states of the plurality of servers to be re-determined, including determining that the first server is in the second server state; and
   instructing, by the server configuration tool, the server imager to perform the second configuration action on the first server based on the re-determined first server state.

13. The non-transitory computer readable medium of claim 12, wherein the multiple states of the plurality of servers are re-determined automatically and periodically.

14. The non-transitory computer readable medium of claim 12, wherein causing the multiple states of the plurality of servers to be re-determined further includes determining that the second server is in a third server state, wherein the method further comprises:
   instructing, by the server configuration tool, the server imager to perform a third configuration action on the second server based on the re-determined second server state.

15. A system of managing servers, the system comprising:
   at least one processor; and
   memory, operatively connected to the at least one processor and storing instructions that, when executed by the at least one processor, cause the system to perform a method, the method comprising:
      receiving, through a user interface, a definition of multiple server states;
      receiving, through the user interface, a defined configuration operation for each of the multiple server states;
      determining, by a server configuration tool, multiple states of a plurality of servers;
      determining, for each of the plurality of servers, one of the defined configuration operations to be performed based on the determined multiple states of the plurality of servers, including determining that a first server is in a first server state while a second server is in a second server state; and
      instructing, by the server configuration tool, a server imager to perform, in parallel, a first configuration operation on the first server based on the first server state and a second configuration action on the second server based on the second server state.

16. The system of claim 15, wherein receiving the definition of multiple server states comprises receiving, for each of the server states, at least a server status and a server pool.

17. The system of claim 15, wherein the method further comprises:
   receiving, through the user interface, a definition of a new server state;
   receiving, through the user interface, a definition of a new configuration operation for the new server state;
   re-determining, by the server configuration tool, multiple states of the plurality of servers; and
   when a third server is determined to be in the new server state, causing the new configuration operation to be performed on the third server.

18. The system of claim 15, wherein the method further comprises:
   receiving, through the user interface, a definition of a new server state;
   receiving, through the user interface, a definition of a reporting operation for the new server state;
   re-determining, by the server configuration tool, multiple states of the plurality of servers;
   when a third server is determined to be in the new server state, causing the reporting operation to be performed.

19. The system of claim 15, wherein the method further comprises:
   causing the multiple states of the plurality of servers to be re-determined, including determining that the first server is in the second server state; and
   instructing, by the server configuration tool, the server imager to perform the second configuration action on the first server based on the re-determined first server state.

20. The system of claim 19, wherein the multiple states of the plurality of servers are re-determined automatically and periodically, and wherein causing the multiple states of the plurality of servers to be re-determined further includes determining that the second server is in a third server state, wherein the method further comprises:
   instructing, by the server configuration tool, the server imager to perform a third configuration action on the second server based on the re-determined second server state.

* * * * *